US012794411B2

(12) United States Patent
Rhee

(10) Patent No.: US 12,794,411 B2
(45) Date of Patent: Nov. 10, 2026

(54) PHOTOVOLTAIC THERMAL REGENERATION SYSTEM AND OPERATING METHOD THEREFOR

(71) Applicant: Samsung Electronics Co., Ltd., Suwon-si (KR)

(72) Inventor: Bongjae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/258,324

(22) Filed: Jul. 2, 2025

(65) Prior Publication Data

US 2025/0330119 A1 Oct. 23, 2025

Related U.S. Application Data

(63) Continuation of application No. PCT/KR2023/020566, filed on Dec. 13, 2023.

(30) Foreign Application Priority Data

Feb. 22, 2023 (KR) ........................ 10-2023-0023928

(51) Int. Cl.
*H02S 40/44* (2014.01)
*H02S 40/38* (2014.01)
*H02S 40/42* (2014.01)

(52) U.S. Cl.
CPC .............. *H02S 40/44* (2014.12); *H02S 40/38* (2014.12); *H02S 40/425* (2014.12)

(58) Field of Classification Search
None
See application file for complete search history.

(56) References Cited

U.S. PATENT DOCUMENTS

2011/0226440 A1 9/2011 Bissell et al.
2016/0156309 A1* 6/2016 Almogy .................. F03G 6/001 60/641.15

(Continued)

FOREIGN PATENT DOCUMENTS

CN 111486501 A 8/2020
CN 112944967 A 6/2021

(Continued)

OTHER PUBLICATIONS

Charles, Performance and Stability of CaCl2•6H2O-Based Phase Change Materials, Online: https://www.researchgate.net/publication/329569469_Performance_and_Stability_of_CaCI26H2O-Based_Phase_Change_Materials, 253 pages, Jan. 2018, JLehigh University.

(Continued)

*Primary Examiner* — Dustin Q Dam
(74) *Attorney, Agent, or Firm* — Nixon & Vanderhye P.C.

(57) ABSTRACT

A system for photovoltaic thermal regeneration may comprise: a light collection panel unit, configured to absorb heat generated from a photovoltaic cell arranged on an front surface thereof by a refrigerant flowing in a pipe passing through the rear surface thereof; and at least two energy storage units having an inner space filled with a thermal energy storage material, and configured to transfer the heat to the thermal energy storage material from the thermal energy of the refrigerant absorbing the heat while passing through the light collection panel unit, and flowing through the pipe passing through the inner space.

10 Claims, 11 Drawing Sheets

(56) References Cited

U.S. PATENT DOCUMENTS

| | | | |
|---|---|---|---|
| 2019/0115869 | A1 | 4/2019 | Escarra et al. |
| 2021/0207895 | A1 | 7/2021 | Bissell et al. |

FOREIGN PATENT DOCUMENTS

| | | | |
|---|---|---|---|
| CN | 114739048 | A | 7/2022 |
| JP | 2003004331 | A | 1/2003 |
| JP | 2014035152 | A | 2/2014 |
| KR | 20150070489 | A | 6/2015 |
| KR | 101578182 | B1 | 12/2015 |
| KR | 20160144842 | A | 12/2016 |
| KR | 20170014984 | A | 2/2017 |
| KR | 20200023545 | A | 3/2020 |
| KR | 20200032345 | A | 3/2020 |

OTHER PUBLICATIONS

International Search Report for PCT/KR2023/020566 mailed Mar. 18, 2024, 6 pages, with English translation.
Written Opinion of the ISA for PCT/KR2023/020566 mailed Mar. 18, 2024, 3 pages.

* cited by examiner

FIG. 5
DAYTIME OPERATION UBROUTINE
510
CAPACITY OF FIRST ENERGY STORAGE UNIT EXCEEDED?
YES
NO
520
CALCULATE CONDITION FOR SUPPLYING THERMAL ENERGY TO FIRST ENERGY STORAGE UNIT
530
SUPPLY CONDITION SATISFIED?
YES
NO
540
SUPPLY THERMAL ENERGY FROM PANEL TO FIRST ENERGY STORAGE UNIT
550
FIRST ENERGY STORAGE UNIT EXCEEDED THRESHOLD TEMPERATURE?
YES
NO
560
SUPPLY THERMAL ENERGY FROM FIRST ENERGY STORAGE UNIT TO HEAT PUMP
570
SUPPLY THERMAL ENERGY FROM SECOND ENERGY STORAGE UNIT TO HEAT PUMP
580
SUPPLY THERMAL ENERGY FROM PANEL VIA SECOND ENERGY STORAGE UNIT TO HEAT PUMP
590
CAPACITY OF SECOND ENERGY STORAGE UNIT EXCEEDED?
YES
NO
600
DISSIPATE HEAT THROUGH DISSIPATION UNIT
RETURN

PHOTOVOLTAIC THERMAL REGENERATION SYSTEM AND OPERATING METHOD THEREFOR

CROSS-REFERENCE TO RELATED APPLICATIONS

This application is a continuation of International Application No. PCT/KR2023/020566 designating the United States, filed on Dec. 13, 2023, in the Korean Intellectual Property Receiving Office and claiming priority to Korean Patent Application No. 10-2023-0023928, filed on Feb. 22, 2023, in the Korean Intellectual Property Office, the disclosures of each of which are incorporated by reference herein in their entireties.

BACKGROUND

Field

The disclosure relates to a photovoltaic thermal regeneration system and an operation method thereof for obtaining and supplying thermal energy together with electricity from sunlight.

Description of Related Art

Recently, global efforts have been underway to restore nature in ways that avoid causing further harm. One example is transitioning from fossil fuels to renewable energy sources such as solar, hydrogen, wind, geothermal, and biomass energy.

An example in solar energy is photovoltaic-thermal (hereinafter, simply 'PVT') power generation. The PVT power generation not only generates electricity using sunlight through a photovoltaic panel but also captures the thermal energy absorbed by the panel for heating or hot water. By utilizing both light and heat, PVT power generation may significantly improve overall energy recovery efficiency.

However, as photovoltaic panels absorb heat during solar power generation, their temperature may rise, which negatively impacts their efficiency and may reduce the power output or shorten the panels' lifespan. To address this, researchers are exploring ways to effectively handle the heat generated by photovoltaic panels. One proposed method involves transferring the heat from the panel through an energy storage unit and then releasing it using a heat pump to cool the panel. Yet, this approach has limitations-since the cooling capacity is constrained by the storage unit's energy capacity, it may not always be sufficient to bring the panel down to the desired temperature using forced cooling alone.

SUMMARY

Embodiments of the disclosure may provide an energy management system and an operating method thereof for diversifying a space for storing thermal energy obtained from sunlight or a path for supplying thermal energy.

A photovoltaic thermal regeneration system according to an example embodiment of the disclosure may comprise: a light collection panel unit including a light collection panel configured to absorb heat generated from a photovoltaic (PV) cell disposed on a front surface by a refrigerant flowing through a pipe passing through a rear surface of the light collection panel unit; at least two energy storage units comprising an inner space including with a thermal energy storage material and configured to transfer, to the thermal energy storage material, heat from thermal energy of the refrigerant flowing through the pipe passing through the inner space after absorbing the heat while passing through the light collection panel unit, wherein at least two energy storage units may include a first energy storage unit (FC-TES) configured to forcibly cool a first thermal energy storage material filling the inner space by a first heat pump; and a second energy storage unit (NC-TES) configured to naturally cool a second thermal energy storage material filling the inner space through heat dissipation.

A method for operating the photovoltaic thermal regeneration system according to an example embodiment of the disclosure may comprise: controlling a first valve to form a circulation path of a refrigerant for transferring thermal energy generated from a light collection panel unit to a first thermal energy storage material filling an inner space of a first energy storage unit; controlling a second valve and a heat pump to form a circulation path of a fluid for forced cooling of the first thermal energy storage material; controlling a third valve to form a circulation path of the refrigerant for transferring the thermal energy generated from the light collection panel unit to a second thermal energy storage material filling an inner space of a second energy storage unit; and controlling a fourth valve to form a circulation path of the fluid for natural cooling of the second thermal energy storage material or forced cooling by the heat pump.

According to an example embodiment of the disclosure, power generation efficiency of a photovoltaic thermal regeneration system may be enhanced.

According to an example embodiment of the disclosure, more heat may be produced by the enhanced power generation efficiency of the photovoltaic thermal regeneration system.

The technical features of the disclosure are not limited to the foregoing, and other technical objects may be derived by one of ordinary skill in the art from example embodiments of the disclosure.

Effects of the present disclosure are not limited to the foregoing, and other unmentioned effects would be apparent to one of ordinary skill in the art from the following description. In other words, unintended effects in practicing embodiments of the disclosure may also be derived by one of ordinary skill in the art from example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used to denote the same or similar elements.

DETAILED DESCRIPTION

Figure 1:
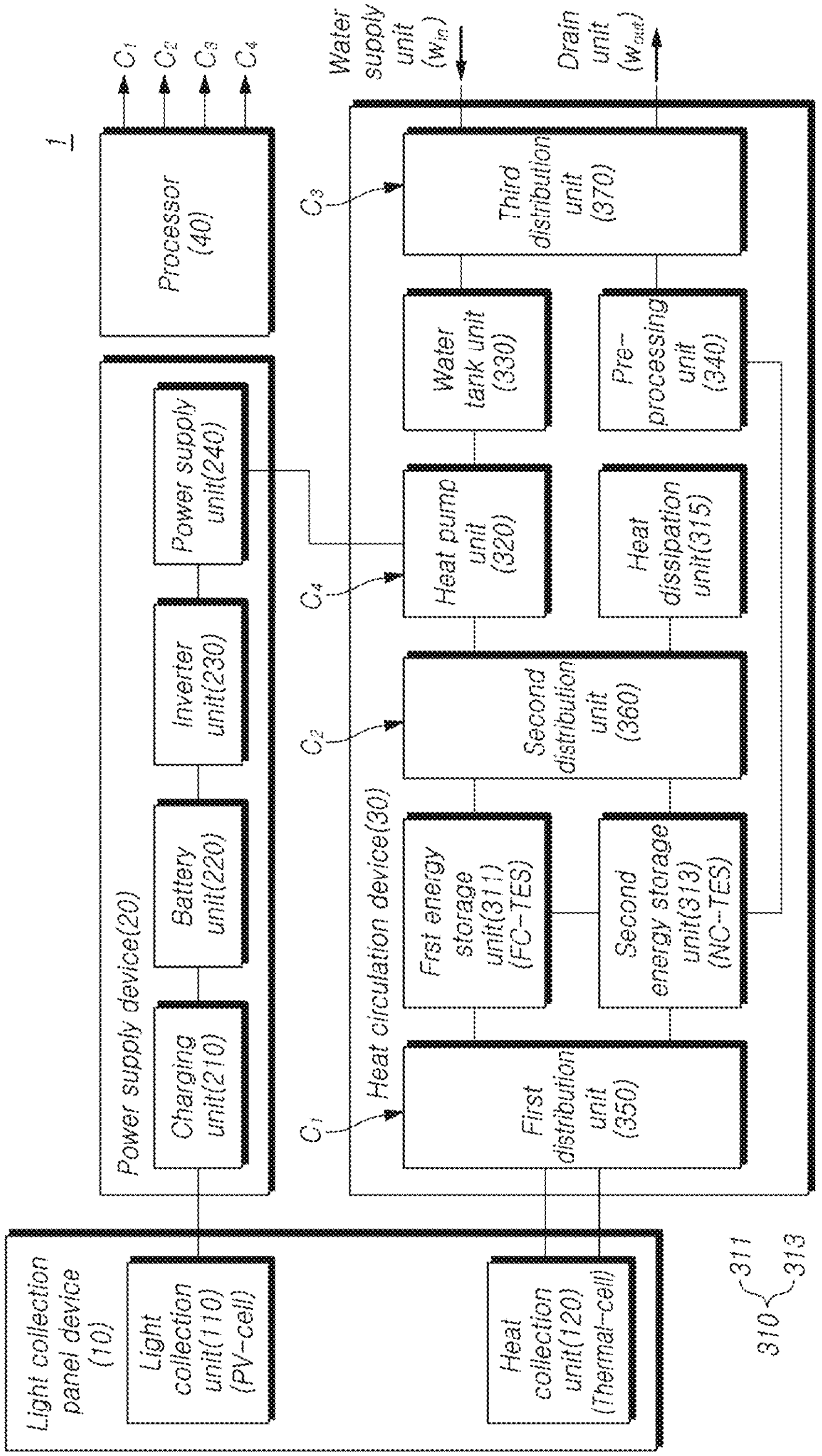
FIG. 1 is a block diagram illustrating an example configuration of a photovoltaic thermal regeneration system according various embodiments.

Embodiments of the present disclosure are now described with reference to the accompanying drawings. However, the disclosure may be implemented in other various forms and is not limited to the various example embodiments set forth herein. The same or similar reference denotations may be used to refer to the same or similar elements throughout the disclosure and the drawings. Further, for clarity and brevity, no description may be made of well-known functions and configurations in the drawings and relevant descriptions.

For use in various embodiments of the disclosure, common terms widely used as possible have been chosen considering functions in the disclosure, but the terms may be varied depending on the intent of one of ordinary skill in the art or case laws or the advent of new technologies. Accordingly, the terms used herein should be determined based on their meanings and the overall disclosure, rather than by the terms themselves.

In various embodiments of the disclosure, when an element "includes" another element, the element may further include the other element, rather excluding the other element, unless particularly stated otherwise.

The term "unit" or "module" used in various embodiments of the disclosure may refer, for example, to a unit that processes at least one function or operation, which may be implemented in hardware, software or firmware, or a combination of hardware, software or firmware.

Hereinafter, in the disclosure, the 'forward direction' and 'reverse direction', which are the directions of energy flow, may be referred to as follows. The 'forward direction' may refer, for example, to a direction in which energy moves from a high energy position to a low energy position, or a direction in which energy moves from a high temperature to a low temperature. The 'reverse direction' may refer, for example, to a direction in which energy moves from a low energy position to a high energy position, or a direction in which energy moves from a low temperature to a high temperature. The term 'fluid' described in the disclosure is a concept that encompasses both 'refrigerant' and 'water'. The 'refrigerant' may refer, for example, to a material for transferring thermal energy, and 'water' may refer, for example, to water ($H_2O$) that may be used as drinking water, industrial water, or household water.

FIG. 1 is a block diagram illustrating an example configuration of a photovoltaic thermal regeneration system 1 according to various embodiments.

Referring to FIG. 1, a photovoltaic thermal regeneration system 1 may include a light collection panel device (e.g., including a light collection panel) 10, a power supply device (e.g., including a power supply) 20, and/or a heat circulation device 30.

The light collection panel device 10 may include a light collection panel to obtain light energy and/or thermal energy from an external light source (e.g., sunlight). In the disclosure, the light collection panel device 10 may be referred to as a light collection panel unit 10. For example, the light collection panel device 10 may include a photovoltaic (PV) cell (hereinafter, referred to as a light collection unit) 110 and/or a heat collection unit 120. The heat collection unit 120 may be disposed on the rear surface of the light collection unit 110.

The light collection unit 110 may obtain light energy from an external light source. The light collection unit 110 may convert the obtained light energy into electrical energy. The light collection unit 110 may output the electrical energy to the power supply device 20.

The heat collection unit 120 may obtain thermal energy from an external light source. The heat collection unit 120 may obtain thermal energy that may be generated during the process of converting light energy by the light collection unit 110 into electrical energy. The heat collection unit 120 may store the obtained thermal energy. The heat collection unit 120 may transfer the stored thermal energy to heat circulation device 30. The heat collection unit 120 may lower its own temperature by transferring the stored thermal energy to the heat circulation device 30.

The heat collection unit 120 may include a radiator. The radiator included in the heat collection unit 120 may release the stored thermal energy into the atmosphere. Although not illustrated, the stored thermal energy may be released into the atmosphere through a radiator (not illustrated) connected to the heat collection unit 120.

The power supply device 20 may include a power supply and receive electric energy from the light collection unit 110. The power supply device 20 may store the supplied electrical energy. The power supply device 20 may supply the received electrical energy or the stored electrical energy to heat circulation device 30. The power supply device 20 may include a charging unit 210, a battery unit 220, an inverter 230, or a power supply unit 240. Although not illustrated, the power supply device 20 may supply the received electrical energy or the stored electrical energy to an external electronic device or an external power supply device.

The charging unit 210 may include various circuitry and convert electrical energy output from the light collection unit 110 into electrical energy for charging the battery unit 220. For example, the charging unit 210 may generate a direct current (DC) voltage for storing electrical energy in the battery unit 220 using the electrical energy output from the light collection unit 110. In this case, the DC voltage generated by the charging unit 210 may have a charging voltage level required by the battery unit 220.

The battery unit 220 may include a battery and store electrical energy output from the light collection unit 110 or the charging unit 210. The battery unit 220 may be implemented as an energy storage system (ESS). The battery unit 220 may output the stored electrical energy to the inverter unit 230.

The inverter unit 230 may include an inverter and receive electric energy from the battery unit 220. Although not illustrated, the inverter unit 230 may receive electric energy from the light collection unit 110 or the charging unit 210. The inverter unit 230 may convert the received direct current (DC) type electrical energy into alternating current (AC) type electrical energy. The inverter unit 230 may output the electrical energy converted into the alternating current form to the power supply unit 240.

The power supply unit 240 may receive electric energy in the form of AC from the inverter unit 230. The power supply unit 240 may be implemented in the form of a power grid. The power supply unit 240 may supply power to an external system (e.g., the external system 2 of FIG. 11) connected to the photovoltaic thermal regeneration system 1. For example, the power supply unit 240 may supply electric energy required to operate a heat pump (e.g., the heat pump unit 320 of FIG. 3).

The heat circulation device 30 may exchange thermal energy with the heat collection unit 120. The exchange of thermal energy may be performed by circulating a refrigerant between the heat collection unit 120 and heat circulation device 30. The refrigerant may be, e.g., a fluid. The refrigerant may exchange thermal energy while circulating between the heat collection unit 120 and heat circulation device 30. The thermal energy exchange may correspond to, e.g., an operation in which thermal energy is transferred by the refrigerant supplied from the heat collection unit 120 to the heat circulation device 30, and the thermal energy is transferred to the heat circulation device 30, so that the cooled refrigerant is transferred to the heat collection unit 120. The cooled refrigerant may cool the heat collection unit 120 by absorbing thermal energy from the heat collection unit 120.

The heat circulation device 30 may include an energy storage unit 310, a heat dissipation unit 315, a heat pump unit 320, a water tank unit 330, or a pre-processing unit 340. The heat circulation device 30 may include at least one distribution unit 350, 360, and 370. In addition to those illustrated, some components of heat circulation device 30 may be omitted, or more components may be added as necessary. Detailed components of the heat circulation device 30 are described in detail with reference to FIGS. 2 to 3.

According to an example, the energy storage unit 310 may store thermal energy obtained by the heat collection unit 120. The energy storage unit 310 may help a cooling operation for lowering the temperature of the heat collection unit 120. For example, in the energy storage unit 310, the temperature of thermal energy storage material provided therein may increase due to thermal energy of the refrigerant introduced after absorbing thermal energy from the heat collection unit 120. The energy storage unit 310 may be divided into at least a plurality of units according to a set temperature (e.g., a temperature at which accumulation of thermal energy may be started). For example, the energy storage unit 310 may include a first energy storage unit 311 or a second energy storage unit 313. Although not illustrated, the energy storage unit 310 may be further divided into more energy storage units as necessary.

For example, the first energy storage unit (e.g., forced cooling-thermal energy storage (FC-TES)) 311 may exchange thermal energy with the refrigerant circulating between it and the heat collection unit 120 through forced cooling. The first energy storage unit 310 may store or accumulate thermal energy through thermal energy exchange by the refrigerant. The first energy storage unit 311 may forcibly exchange thermal energy through the heat pump unit 320. The first energy storage unit 311 may consume thermal energy stored or accumulated through heat exchange with the heat pump unit 320. The consumption may be to use stored or accumulated thermal energy for other purposes or to move it to another position. An operation principle of the heat pump unit 320 is described in detail with reference to FIG. 2.

For example, the second energy storage unit (e.g., natural cooling-thermal energy storage (NC-TES)) 313 may exchange thermal energy with the refrigerant circulating between it and the heat collection unit 120 through natural cooling. The second energy storage unit 313 may store or accumulate thermal energy through thermal energy exchange by the refrigerant. The second energy storage unit 313 may be thermally connected to a radiator (e.g., the heat dissipation unit 315 of FIG. 2). The second energy storage unit 313 may dissipate heat to the outside (e.g., atmosphere or ambient air) through the heat dissipation unit 315. The second energy storage unit 313 may exhaust stored or accumulated thermal energy through heat exchange with the outside. The exhaust may refer, for example, to dissipation of stored or accumulated thermal energy rather than using it for other purposes or moving it to another position. A cooling capacity for exhausting thermal energy may be determined in the heat dissipation unit 315 according to weather conditions or installation environments. The heat dissipation unit 315 may be omitted.

For example, the second energy storage unit 313 may exchange energy in a forced cooling method as well. The second energy storage unit 313 may forcibly exchange thermal energy through the heat pump unit 320. The second energy storage unit 313 may consume thermal energy stored or accumulated through heat exchange with the heat pump unit 320. The consumption may be to use stored or accumulated thermal energy for other purposes or to move it to another position.

The water tank unit 330 may include a tank and store water supplied from a water supply unit $w_{in}$. The water tank 330 may store water supplied from the pre-processing unit 340. The water tank unit 330 may receive thermal energy from the heat pump unit 320. The water tank unit 330 may be connected to the heat pump unit 320 in series. The water tank unit 330 may be connected to the heat pump unit 320 by a conduit for circulating the refrigerant. A storage for temporarily storing the refrigerant may be provided inside the water tank unit 330. The storage may be implemented as, e.g., a heat exchanger. One end of the storage may be connected to one end (e.g., an output end) of the heat pump unit 320. The other end of the storage may be connected to the other end (e.g., an input end) of the heat pump unit 320. When the water tank unit 330 simply stores water, the water tank unit 330 may be implemented as a tank. When the water tank unit 330 implements a function of storing energy, the water tank unit 330 may be implemented as a thermal energy storage (TES) for output. Water may be stored in the water tank unit 330. Water present in the water tank unit 330 may be heated to a predetermined (e.g., specified) temperature by receiving thermal energy from the heat pump unit 320. Water heated to the predetermined temperature may be used as heating water or hot water.

According to an embodiment, the heat circulation device 30 may include at least one distribution unit 350, 360, and 370. The at least one distribution unit 350, 360, and 370 may be provided to control the movement of the fluid. The at least one distribution unit 350, 360, and 370 may include a valve and/or a pump. The valve may be implemented as, e.g., a valve, an orifice, or a damper. The pump may operate to create a flow of fluid.

According to an example, the first distribution unit 350 may be provided to control a passage through which the fluid will circulate between the heat collection unit 120 and the energy storage unit 310. For example, the first distribution unit 350 may control a moving path of the refrigerant to circulate between the heat collection unit 120 and the first energy storage unit 311. The first distribution unit 350 may control a moving path of the refrigerant to circulate between the heat collection unit 120 and the second energy storage unit 313.

According to an example, the second distribution unit 360 may be provided to control a passage through which the fluid circulates between the energy storage unit 310 and the heat pump unit 320. For example, the second distribution unit 360 may control a moving path of the refrigerant to circulate between the first energy storage unit 311 and the heat pump unit 320. The second distribution unit 350 may control a moving path of the refrigerant to circulate between the second energy storage unit 311 and the heat pump unit 320. The second distribution unit 360 may control a moving path of the refrigerant to circulate between the second energy storage unit 313 and the heat dissipation unit 315.

According to an example, the third distribution unit 370 may be provided to control a passage through which the fluid is circulated between the water tank unit 330, the pre-processing unit 340, or the water supply/drain unit. For example, the third distribution unit 370 may control a passage through which water supplied from the water supply unit $w_{in}$ moves to the pre-processing unit 340 and/or the water tank unit 330. The third distribution unit 370 may control a passage through which water present in the water tank unit 330 moves to the drain unit $w_{out}$. The third distribution unit 370 may control a passage through which water present in the pre-processing unit 340 moves to the water tank unit 330.

According to an example, the photovoltaic thermal regeneration system 1 may include a processor 40. The processor 40 may control overall operations to be performed by the photovoltaic thermal regeneration system 1. The processor 40 may communicate with a server (not illustrated) to obtain or transmit information necessary to control the photovoltaic thermal regeneration system 1.

According to an example, the processor 40 may include various processing circuitry and transmit and/or receive an electrical signal to or from one of components included in the photovoltaic thermal regeneration system 1. The electrical signal transmitted by the processor 40 may be referred to as Cout, and the electrical signal received by the processor 40 may be referred to as Cin.

For example, the processor 40 may obtain information about the amount of energy obtained by the light collection panel device 10. The processor 40 may obtain information about the amount of electrical energy stored in the power supply device 20. The processor 40 may receive information about the amount of thermal energy to be supplied by heat circulation device 30. The amount of thermal energy to be supplied may be, e.g., the amount of thermal energy expected to be consumed for a time set by an external device (e.g., one day, or a time from sunset to sunrise).

For example, the processor 40 may transmit a signal for operating or stopping the power supply device 20.

For example, the processor 40 may obtain information about the amount of thermal energy supplied by the heat pump unit 320. The processor 40 may obtain information about the amount of electrical energy required for the heat pump unit 320 to operate. The processor 40 may obtain information about the amount of thermal energy consumed by the pre-processing unit 340. The processor 40 may obtain information about the amount of thermal energy supplied from the external heat source unit 380.

For example, the processor 40 may output a signal for controlling at least one distributor 350, 360, and 370. The processor 40 may open or close the valve of the at least one distribution unit 350, 360, and 370, or transmit a control signal for operating the pump.

For example, the processor 40 may output a signal $c_1$ for controlling the first distribution unit 350. The processor 40 may output a signal $c_2$ for controlling the second distribution unit 360. The processor 40 may output a signal $c_3$ for controlling the third division unit 370.

According to an example, the processor 40 may transmit a signal $c_4$ for controlling the heat pump unit 320. The processor 40 may output a control signal $c_4$ for operating or stopping the heat pump unit 320. The processor 40 may output a control signal $c_4$ for operating or stopping the pre-processing unit 340.

According to an example, the processor 40 may obtain information about weather information around the photovoltaic thermal regeneration system 1 from the server. The weather information may include, e.g., weather information corresponding to an area and time when the photovoltaic thermal regeneration system 1 is located. The weather information may include, e.g., information about the amount of sunlight corresponding to the area and time when the photovoltaic thermal regeneration system 1 is located.

According to an example, the processor 40 may obtain information detected by the photovoltaic thermal regeneration system 1. For example, the processor 40 may obtain information about the surface temperature detected by the light collection panel device 10. The processor 40 may obtain information about the presence or absence of a foreign object (e.g., rain, snow, or hail) on the surface of the light collection panel device 10. The processor 40 may obtain information about the temperature or pressure detected by the energy storage unit 310, the heat dissipation unit 315, the heat pump unit 320, or the water tank unit 330.

According to an example, the processor 40 may calculate an energy production amount and consumption amount of the photovoltaic thermal regeneration system 1. The processor 40 may calculate light energy and thermal energy obtained by the light collection panel device 10 from an external light source. The processor 40 may calculate energy to be consumed by the power supply device 20. For example, the power supply device 20 may consume energy to heat water supplied from the outside, or may consume energy through cooling.

For example, the processor 40 may predict the electrical energy supplied, or to be supplied, by the power supply unit 240 to the heat pump unit 320.

For example, the processor 40 may predict thermal energy to be consumed by heat circulation device 30. The processor 40 may predict thermal energy to be consumed by the heat pump unit 320. The processor 40 may predict thermal energy required to heat water to be stored in the water tank unit 330.

According to an example, the processor 40 may select an operation type of the photovoltaic thermal regeneration system 1. The operation mode may select one of, e.g., a daytime operation, a nighttime operation, and a defrosting operation. The operation mode may be selected based on weather information or energy consumption. The control operation for each operation mode is described below in greater detail with reference to FIG. 5.

Figure 2:
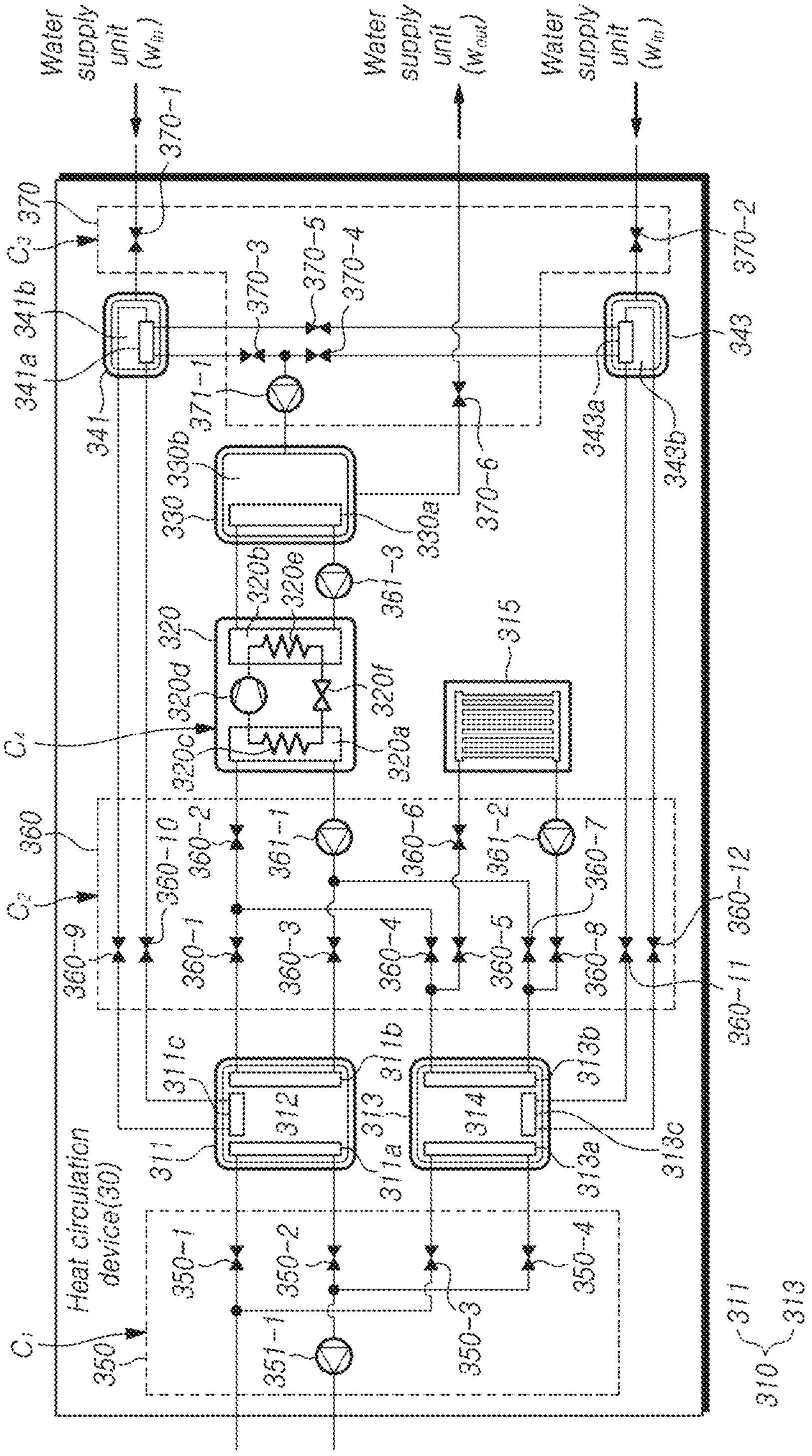
FIG. 2 is a diagram illustrating an example configuration of a heat circulation device included in a photovoltaic thermal regeneration system according to various embodiments.

FIG. 2 is a diagram illustrating an example configuration of a heat circulation device 30 included in a photovoltaic thermal regeneration system 1 according to various embodiments.

Referring to FIG. 2, some components of the illustrated heat circulation device 30 may correspond to all or some of some components of the photovoltaic thermal regeneration system 1 illustrated in FIG. 1. Therefore, redundant descriptions of corresponding components may not be repeated here.

According to an example, a heat circulation device 30 may include at least one energy storage unit 311 and 313, a heat dissipation unit 315, a heat pump unit 320, a water tank unit 330, at least one pre-processing unit 341 and 343 (e.g., the pre-processing unit 340 of FIG. 1), or at least one distribution unit 350, 360, and 370.

According to an example, at least one or more energy storage units 311 and 313 may be provided to circulate thermal energy obtained by the heat collection unit (e.g., the heat collection unit 120 of FIG. 1). The at least one or more energy storage units 311 and 313 may include a first energy storage unit (e.g., the first energy storage unit 311 of FIG. 1) or a second energy storage unit (e.g., the second energy storage unit 313).

According to an embodiment, the first energy storage unit 311 may include at least one heat exchange unit 311*a*, 311*b*, and 311*c*. The at least one heat exchange unit 311*a*, 311*b*, and 311*c* may include a 1-1th heat exchange unit 311*a*, a 1-2th heat exchange unit 311*b*, or a 1-3 heat exchange unit 311*c*. A first heat exchange material 312 may be present in the first energy storage unit 311.

For example, the 1-1th heat exchange unit 311*a* may be provided to exchange thermal energy between the refrigerant circulating between the first energy storage unit 311 and the heat collection unit 120 and the first heat exchange material 312. The 1-2th heat exchange unit 311*b* may be provided to exchange thermal energy between the refrigerant circulating between the first energy storage unit 311 and the heat pump unit 320 and the first heat exchange material 312. The 1-3 heat exchange unit 311*c* may be provided to exchange thermal energy between the refrigerant circulating between the first energy storage unit 311 and the first pre-processing unit 341 and the first heat exchange material 312.

According to an embodiment, the second energy storage unit 311 may include at least one heat exchange unit 313*a*, 313*b*, and 313*c*. The at least one heat exchange unit 313*a*, 313*b*, and 313*c* may include a 2-1th heat exchange unit 313*a*, a 2-2th heat exchange unit 313*b*, or a 2-3th heat exchange unit 313*c*. A second heat exchange material 314 may be present in the second energy storage unit 313.

For example, the 2-1th heat exchange unit 313*a* may be provided to exchange thermal energy between the refrigerant circulating between the second energy storage unit 313 and the heat collection unit 120 and the second heat exchange material 314. The 2-2th heat exchange unit 313*b* may be provided to exchange thermal energy between the second energy storage unit 313 and the heat pump unit 320 or between the second energy storage unit 313 and the heat dissipation unit 315 and the second heat exchange material 314. The 2-3th heat exchange unit 313*c* may be provided to exchange thermal energy between the refrigerant circulating between the second energy storage unit 313 and the second pre-processing unit 343 and the second heat exchange material 314.

According to an example, the at least one energy storage unit 311 and 313 may be implemented in the form of a tank where a material (e.g., a heat exchange material) to transfer thermal energy is stored.

According to an example, the heat exchange material may be present in at least one of the energy storage units 311 and 313. A first heat exchange material 312 may be present in the first energy storage unit 311. A second heat exchange material 314 may be present in the second energy storage unit 313. The heat exchange material may include, e.g., a material for storing heat as sensible heat or a phase change material (PCM) or a thermal-chemical material (TCM).

For example, materials that store heat with sensible heat may include water, sand, or the like.

For example, the PCM may include sodium chloride (NaCl), calcium chloride ($CaCl_2$)), and magnesium nitrate ($Mg(NO_3)_2$). The melting point of the PCM may be adjusted by adjusting the concentration of the material forming the PCM. By adjusting the melting point of the PCM, the set temperature of the first energy storage unit 311 or the second energy storage unit 313 may be adjusted.

For example, when the heat exchange material is implemented as a PCM, the heat exchange material may transfer or receive thermal energy required for phase change from a refrigerant. For example, the thermal energy may be absorbed or released in the form of latent heat.

For example, when the heat exchange material is implemented as TCM, the heat exchange material may transfer or receive thermal energy required for a chemical reaction from a refrigerant. The thermal energy may be absorbed or released, e.g., in the form of energy required for the heat exchange material to perform an endothermic reaction or an exothermic reaction.

According to an example, at least one energy storage unit 310 may be implemented as a sensible thermal storage instead of controlling temperature with a heat exchange material to control temperature. In this case, the at least one energy storage unit 310 may be implemented in the form of a tank where water is stored.

According to an example, at least one energy storage unit 310 may include a first energy storage unit 311 or a second energy storage unit 313. The first energy storage unit 311 may exchange energy in a forced cooling method. The first energy storage unit 311 may forcibly exchange thermal energy through a heat pump 321 (e.g., the first heat pump 321 of FIG. 1). The second energy storage unit 313 may exchange energy in a natural cooling method. The second energy storage unit 313 may be thermally connected to the heat radiating unit 315. The second energy storage unit 313 may dissipate heat to the outside (e.g., atmosphere or ambient air) through the heat dissipation unit 315. The second energy storage unit 313 may receive heat from the outside through the heat dissipation unit 315. Although not illustrated, the second energy storage unit 313 may exchange heat from an external heat source unit (e.g., the external heat source unit 380 of FIG. 3). The external heat source unit may include, e.g., geothermal heating, hydrothermal heating, or district heating.

According to an example, the first energy storage unit 311 and the second energy storage unit 313 may have the same or different set temperatures. The set temperatures of the first energy storage unit 311 and the second energy storage unit 313 may be set differently for each season or month.

For example, the set temperature of the first energy storage unit 311 may be lower than the set temperature of the second energy storage unit 313. The set temperature of the first energy storage unit 311 may be set to be lower than the lowest temperature of the atmosphere, for example. The set temperature of the second energy storage unit 313 may be set to be higher than the maximum atmospheric temperature at night or after sunset.

Although not illustrated, the at least one energy storage unit 310 may include more energy storage units in addition to the first energy storage unit 311 or the second energy storage unit 313. The energy storage unit additionally included in the at least one energy storage unit 310 may be cooled by either a forced cooling method or a natural cooling method. In other words, the at least one energy storage unit 310 may be divided into a plurality of units. Since the at least one energy storage unit 310 is divided into a plurality of tanks, the temperature inside the tank may be quickly controlled as compared with one tank having the same volume. Assuming a circumstance in which the same energy is input/output, the temperature of each energy storage unit 310 divided into the plurality of tanks may be rapidly changed compared to the energy storage unit 310 implemented as one tank.

According to an example, the heat pump unit 320 may be provided to raise the temperature of, and output, the thermal energy absorbed to the input end. At least one heat exchanger 320*a* and 320*b* may be provided inside the heat pump unit 320. The at least one heat exchanger 320*a* and 320*b* may include a 3-1th heat exchanger 320*a* or a 3-2th heat exchanger 320*b*.

For example, the 3-1th heat exchanger 320*a* may be provided to transfer thermal energy between it and the 1-2th heat exchanger 311*b* provided in the first energy storage unit 311. The 3-1th heat exchanger 320*a* may be provided to transfer thermal energy between it and the 2-2th heat exchanger 313*b* provided in the second energy storage unit 313.

For example, the 3-2th heat exchanger 320*b* may be provided to transfer thermal energy between it and the heat exchangers 330*a* provided in the water tank 330. The 3-2th heat exchanger 320*b* may transfer thermal energy to the water 330*b* present inside the water tank 330. The water 330*b* that has received thermal energy from the heat pump unit 320 may be heated to a predetermined temperature.

According to an example, the heat pump unit 320 may include an evaporator 320*c*, a compressor 320*d*, a condenser 320*e*, or an expansion device 320*f*. The refrigerant provided in the heat pump 321 circulates between the evaporator 320*c*, the compressor 320*d*, the condenser 320*e*, and the expansion device 320*f* to discharge the elevated-temperature heat (e.g., compression heat) to the output end. The heat pump unit 320 may receive electric energy from the outside. The electrical energy may be supplied from, e.g., a power supply unit (e.g., the power supply unit 240 of FIG. 1).

According to an example, the heat pump unit 320 may derive performance through a coefficient of performance (hereinafter, "COP"). The COP may be represented as a ratio of output energy to energy input to operate the heat pump unit 320. For example, if 4 KJ (kilojoules) of thermal energy is input to the input end of the heat pump unit 320, 1 KJ of electric energy is input to operate the heat pump unit 320, and 5 KJ of thermal energy is output from the output end of the heat pump unit 320, the COP of the heat pump unit 320 may be 5. The COP may be decreased as the temperature difference between the input end and the output end of the heat pump unit 320 increases. In order to prevent and/or suppress the COP of the heat pump unit 320 from decreasing, the heat pump unit 320 may be additionally installed according to a set temperature, or water previously heated by at least one pre-processing unit 341 and 343 may be input to the water tank unit 330.

For example, the evaporator 320*c* may be provided in the 3-1th heat exchanger 320*a* of the heat pump unit 320. The evaporator 320*c* may suction the input low-temperature and low-pressure refrigerant.

For example, the compressor 320*d* may be fluidly connected to an output end of the evaporator 320*c*. The compressor 320*d* may compress the low-temperature and low-pressure refrigerant output from the evaporator 320*c*. The compressor 320*d* may compress the low-temperature and low-pressure refrigerant to generate high-temperature and high-pressure refrigerant steam.

For example, the condenser 320*e* may be fluidly connected to an output end of the compressor 320*d*. The condenser 320*e* may condense and liquefy the high-temperature and high-pressure refrigerant output from the compressor 320*d*. latent heat of condensation may be generated from the refrigerant liquefied from the condenser 320*e*. The latent heat of condensation may be discharged to the output end of the heat pump 321. The latent heat of condensation may heat water provided in a water tank (or tank) (e.g., the first water tank 331) connected to the output end of the heat pump 321.

For example, the expansion device 320*f* may be fluidly connected to an output end of the condenser 320*e*. The expansion device 320*f* may expand the liquid refrigerant output from the condenser 320*e*. The expanded liquid refrigerant may be converted into a mixed material where a low-temperature and low-pressure gas and a liquid are mixed. The mixed material may absorb evaporation latent heat from at least one thermal energy storage unit 311 and 313 at the input end of the heat pump unit 320 to change the phase into a low-temperature and low-pressure refrigerant gas.

Although not illustrated, the heat circulation device 30 may further include a plurality of heat pumps. For example, the plurality of heat pumps may include a first heat pump 321 (e.g., the first heat pump 321 of FIG. 3), a second heat pump (e.g., the second heat pump 323 of FIG. 3), or a third heat pump (e.g., the third heat pump 325 of FIG. 3). The plurality of heat pumps have the same configuration, or some of the components may be omitted, or more components may be added as necessary.

Figure 3:
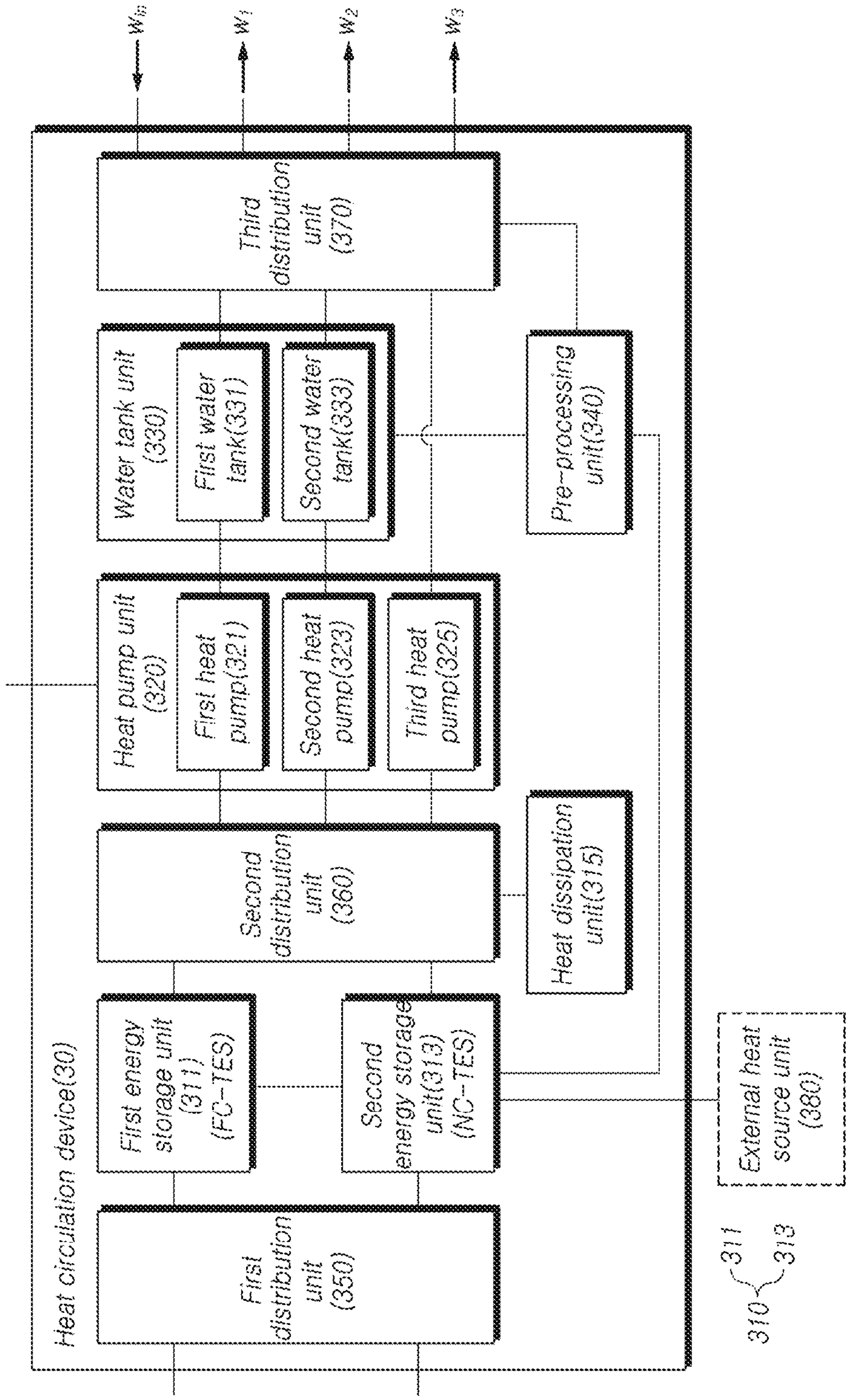
FIG. 3 is a block diagram illustrating an example configuration of a heat circulation device included in a photovoltaic thermal regeneration system according to various embodiments.

For example, the water tank unit 330 may include a first water tank (e.g., the first water tank 331 of FIG. 3) or a second water tank (e.g., the second water tank 333 of FIG. 3). Water heated to different target heating temperatures or different temperatures may be stored in the first water tank 331 or the second water tank 333. Water at a first temperature (e.g., 20 to 40° C.) may be stored in the first water tank 331. Water at a second temperature (e.g., 40 to 80° C.) may be stored in the second water tank 333. Although not illustrated, the water tank unit 330 may further include an additional water tank as necessary. In addition to the description, the temperature of the water present in the water tank unit 330 may be variously set.

According to an embodiment, the water tank 330 may be connected to one or more pre-processing units 341 and 343. The pre-processing units 341 and 343 may be selectively provided as necessary. The pretreatment portions 341 and 343 may be implemented in the form of a tank for storing water. The pre-processing units 341 and 343 may pre-heat the water to be input to the water tank unit 330 to a predetermined temperature.

According to an embodiment, the at least one pre-processing unit 341 or 343 may include a first pre-processing unit 341 or a second pre-processing unit 343. The first pre-processing unit 341 may include a heat exchanger 341*a*. The heat exchanger 341*a* may be connected to the 1-3 heat exchanger 311*c* provided in the first energy storage unit 311. Water 341*b* having a predetermined temperature may be present inside the first pretreatment portion 341. The temperature of the water 341*b* may be, e.g., the temperature of water supplied to the water supply unit $w_{in}$.

For example, the refrigerant circulating between the heat exchanger 341*a* provided in the first pre-processing unit 341 and the 1-3 heat exchanger 311*c* may transfer energy to the water 341*b* present in the first pre-processing unit 341. The water 341*b* may be heated to a predetermined temperature. The water 341*b* may be input to the water tank 330.

According to an embodiment, the second pre-processing unit 343 may include a heat exchanger 343*a*. The heat exchanger 343*a* may be connected to the 2-3th heat exchanger 313*c* provided in the second energy storage unit 313. Water 343*b* having a predetermined temperature may be present inside the second pretreatment portion 343. The temperature of the water 343*b* may be, e.g., the temperature of water supplied to the water supply unit $w_{in}$.

For example, the refrigerant circulating between the heat exchanger 343*a* provided in the second pre-processing unit 343 and the 2-3th heat exchanger 313*c* may transfer energy to the water 343*b* present inside the second pre-processing unit 343. The water 343*b* may be heated to a predetermined temperature. The water 343*b* may be input to the water tank 330.

According to an example, a predetermined amount of water may be stored in the water tank unit 330. The water tank unit 330 may be implemented in the form of a tank for storing the predetermined amount of water. The water tank unit 330 may be implemented as a thermal energy storage (TES) for output capable of output.

According to an embodiment, the water tank 330 may include a heat exchanger 330*a*. The heat exchanger 330*a* may be connected to the 3-2th heat exchanger 320*b* provided in the heat pump unit 320. Water 330*b* having a predetermined temperature may be present inside the water tank unit 330. The water 330*b* may be supplied from at least one pre-processing unit 341 and 343. The water 330*b* may be water heated by the at least one pretreatment portion 341 or 343. The water 330*b* may receive energy from a refrigerant circulating between the heat exchanger 330*a* and the second heat exchanger 320*b* provided in the heat pump unit 320. The water 330*b* may be heated to a predetermined temperature.

Although not illustrated, the at least one water tank unit 330 may further include a water tank. For example, the at least one water tank 330 may include a first water tank (e.g., the first water tank 331 of FIG. 3) or a second water tank (e.g., the second water tank 333 of FIG. 3). The at least one water tank 330 may be added according to temperature or use.

According to an example, hot water having a predetermined temperature may be output to the drain unit $w_{out}$ of the water tank unit 330. The hot water may be used for various purposes including heating. The hot water may be used for various purposes according to a set temperature. Table 1 below illustrates examples of the use of hot water according to the temperature of use.

TABLE 1

| purposes | usage temperature (° C.) |
|---|---|
| drinking | 50-55 |
| bathing (for adults) | 42-45 |
| bathing (for children) | 40-42 |
| shower | 43 |
| washing face | 40-42 |
| medical hand washing | 43 |
| swimming pool | 21-27 |
| kitchen (general) | 45 |
| kitchen (washing dishes) | 45-60 |
| kitchen (rinsing dishes) | 70-80 |
| cleaning (commercial, general) | 60 |
| cleaning (silk/wool) | 33-37/38-49 |
| cleaning (linen/cotton) | 49-52/60 |
| car wash | 24-30 |

Table 1 illustrates an example temperature setting range of hot water according to the use. The temperature of the hot water present inside the water tank unit 330 may be set according to the use of the hot water.

According to an embodiment, the heat circulation device 30 may include at least one distribution unit 350, 360, and 370. The at least one distribution unit 350, 360, and 370 may include a first distribution unit 350, a second distribution unit 360, or a third distribution unit 370. The at least one distribution unit 350, 360, and 370 may include at least one valve or pump.

According to an example, the first distribution unit 350 may be provided to control the flow of the fluid between the heat collection unit 120 and the energy storage unit 310. For example, the first distribution unit 350 may control a path through which the refrigerant present between the heat collection unit 120 and the first energy storage unit 311 moves. The first distribution unit 350 may control a path through which the refrigerant present between the heat collection unit 120 and the second energy storage unit 313 moves.

For example, the first distribution unit 350 may include one or more valves 350-1, 350-2, 350-3, and 350-4 or a pump 351-1. The at least one valve 350-1, 350-2, 350-3, and 350-4 may include a valve 1-1 350-1, a valve 1-2 350-2, a valve 1-3 350-3, or a valve 1-4 350-4. The valve 1-1 350-1 may open or close a passage for moving the refrigerant from the heat collection unit 120 to the first energy storage unit 311. The valve 1-2 350-2 may open or close a passage for moving the refrigerant from the first energy storage unit 311 toward the heat collection unit 120. The valve 1-3 350-3 may open or close a passage for moving the refrigerant from the heat collection unit 120 to the second energy storage unit 313. The valves 1-4 350-4 may open or close a passage for moving the refrigerant from the second energy storage unit 313 toward the heat collection unit 120. The pump 351-1 may make a flow for circulating the refrigerant from the first energy storage unit 311 or the second energy storage unit 313 toward the heat collection unit 120. The pump 351-1 may guide the flow of the fluid so that the refrigerant does not flow back in the reverse direction.

According to an example, the second distribution unit 360 may be provided to control a fluid present between the energy storage unit 310 and the heat pump unit 320. For example, the second distribution unit 360 may control a path through which the refrigerant moves between the first energy storage unit 311 and the heat pump unit 320. The second distribution unit 350 may control a path through which the refrigerant moves between the second energy storage unit 311 and the heat pump unit 320. The second distribution unit 360 may control a path through which the refrigerant moves between the second energy storage unit 313 and the heat dissipation unit 315.

For example, the second distribution unit 360 may include at least one valve 360-1, 360-2, 360-3, 360-4, 360-5, 360-5, 360-6, 360-7, 360-8, 360-9, 360-10, 360-11, and 360-12, or at least one pump 361-1 and 361-2. The at least one valve 360-1, 360-2, 360-3, 360-4, 360-5, 360-5, 360-6, 360-7, 360-8, 360-9, 360-10, 360-11, and 360-12 may include a valve 2-1 360-1, a valve 2-2 360-2, a valve 2-3 360-3, a valve 2-4 360-4, a valve 2-5 360-5, a valve 2-6 360-6, a valve 2-7 360-7, a valve 2-8 360-8, a valve 2-9 360-9, a valve 2-10 360-10, a valve 2-11 360-11, or a valve 2-12 360-12. The at least one pump 361-1 and 361-2 may include a pump 2-1 361-1 or a pump 2-2 361-2.

For example, the valve 2-1 360-1 may control the outflow of the refrigerant from the second heat exchanger **311*b* provided in the first energy storage unit 311. The valve 2-2 360-2 may control the inflow of the refrigerant into the first heat exchanger 320*a* provided in the heat pump unit 320. The valve 2-3 360-3 may control the inflow of the refrigerant into the second heat exchanger 311*b* provided in the first energy storage unit 311. The valve 2-4 360-4 may control the outflow of the refrigerant from the second heat exchanger 313*b* provided in the second energy storage unit 313 toward the heat pump unit 320. The valve 2-5 360-5 may control the outflow of the refrigerant from the second heat exchanger 313*b* provided in the second energy storage unit 313 toward the heat dissipation unit 315. The valve 2-6 360-6 may control the inflow of the refrigerant into the heat dissipation unit 315. The valve 2-7 360-7 may control the inflow of the refrigerant into the second heat exchanger 313*b* provided in the second energy storage unit 313. The valve 2-8 360-8 may control the inflow of the refrigerant into the second heat exchanger 313*b* provided in the second energy storage unit 313 from the heat dissipation unit 315. The valve 2-9 360-9 may control the outflow of the refrigerant from the third heat exchanger 311*c* provided in the first energy storage unit 311 toward the first pre-processing unit 341. The valve 2-10 360-10 may control the inflow of the refrigerant into the third heat exchanger 311*c* provided in the first energy storage unit 311 from the first pre-processing unit 341. The valve 2-11 360-11 may control the outflow of the refrigerant from the third heat exchanger 313*c* provided in the second energy storage unit 313 toward the second pre-processing unit 343. The valve 2-12 360-12 may control the inflow of the refrigerant into the third heat exchanger 313*c* provided in the second energy storage unit 313 from the second pre-processing unit 343**.

For example, the pump 2-1 361-1 may generate a flow where the refrigerant moves from the heat pump unit 320 toward the first energy storage unit 311 or the second energy storage unit 313. The pump 2-2 361-2 may generate a flow where the refrigerant moves from the heat dissipation unit 315 to the second energy storage unit 313. The at least one pump 361-1 and 361-2 may guide the flow of the fluid so that the refrigerant does not flow back in the reverse direction.

For example, the third distribution unit 370 may include at least one valve 370-1, 370-2, 370-3, 370-4, 370-5, and 370-6, or a pump 371-1. The at least one valve 370-1, 370-2, 370-3, 370-4, 370-5, and 370-6 may include a valve 3-1 370-1, a valve 3-2 370-2, a valve 3-3 370-3, a valve 3-4 370-4, a valve 3-5 370-5, or a valve 3-6 370-6.

For example, the valve 3-1 370-1 may open or close a path through which water flows from the water supply unit $w_{in}$ to the first pre-processing unit 341. The valve 3-2 370-2 may open or close a path through which water flows from the water supply unit $w_{in}$ to the second pre-processing unit 343. The valve 3-3 370-3 may open or close a path through which water flows from the first pre-processing unit 341 to the water tank unit 330. The valve 3-4 370-4 may open or close a path through which water flows from the second pre-processing unit 343 to the water tank unit 330. The valve 3-5 370-5 may open or close a path through which water moves between the first pre-processing unit 341 and the second pre-processing unit 343. The pump 371-1 may open or close a path through which water flows from the first pre-processing unit 341 or the second pre-processing unit 343 toward the water tank unit 330. The pump 371-1 may guide the flow of the fluid so that the refrigerant does not flow back in the reverse direction.

According to an example, the valves or pumps of the first to third distribution units 350, 360, and 370 may be variously applied corresponding to the components of the heat circulation device 30. For example, in FIG. 2, as one heat pump unit 320 is illustrated, one valve (e.g., the valve 2-2 360-2) that controls the refrigerant input to the second distribution unit 350 in the direction of the heat pump unit 320 and one pump (e.g., the pump 2-1 361-1) that controls the refrigerant output from the heat pump unit 320 are provided but, when the heat pump unit 320 includes a plurality of heat pumps, additional valves and pumps may be provided. For example, when the energy storage units 311 and 313 include a larger number of energy storage units, additional valves or pumps input and/or output to/from each energy storage unit may be provided.

According to an example, the processor (e.g., the processor 40 of FIG. 1) may control a path through which refrigerant or water moves by controlling a valve or pump provided in at least one distribution unit 350, 360, and 370. This is described below with reference to FIG. 5.

FIG. 3 is a block diagram illustrating an example configuration of a heat circulation device 30 included in a photovoltaic thermal regeneration system 1 according to various embodiments. The heat circulation device 30 may be an application example of the system diagram of the photovoltaic thermal regeneration system 1 according to an embodiment of the disclosure, and components are added as necessary. Therefore, the description of the overlapping configurations is omitted, and the description is mainly described based on the differences.

Referring to FIG. 3, the heat pump unit 320 may further include a third heat pump 325. The configuration of the third heat pump 325 may be the same as or similar to that of the first heat pump 321 (e.g., the heat pump 321 of FIG. 2). For example, the third heat pump 325 may include an evaporator, a compressor, a condenser, or an expansion device. The third heat pump 325 may receive power required for driving the third heat pump 325 from the power supply unit 240.

According to an example, the third heat pump 325 may output heat of a hither temperature than the heat input from thermal energy storage unit 310. The third heat pump 325 may output heat that has a higher temperature than the heat input by the same principle as the first heat pump 321.

According to an example, a tank for storing water to be heated may be provided inside the third heat pump 325. The tank may be independently provided outside the third heat pump 325. One end of the third heat pump 325 through which heat is output may be connected to an input end of the tank through a conduit through which the refrigerant enters and exits. Refrigerant flows in and out of the conduit, transferring thermal energy to water stored in the tank. Water stored in the tank may be heated by receiving thermal energy through the third heat pump 325.

According to an example, the set temperature of the third heat pump 325 may be different from the set temperature of the first heat pump 321 or the second heat pump 323. For example, the set temperature of the third heat pump 325 may be higher than the set temperature of the first heat pump 321 or the second heat pump 323. The set temperature of the third heat pump 325 may be, e.g., 120° C. to 160° C. The third heat pump 325 may output steam having the set temperature.

According to an example, the third heat pump 325 may discharge steam of a predetermined temperature to the output end of the tank. The predetermined temperature may be, e.g., 120° C. to 160° C.

According to an example, the first distribution unit 350 may be provided to control a path through which the fluid present between the heat collection unit 120 and the energy storage unit 310 is to circulate. For example, the first distribution unit 350 may control a path through which the refrigerant moves between the heat collection unit 120 and the first energy storage unit 311. The first distribution unit 350 may control a path through which the refrigerant moves between the heat collection unit 120 and the second energy storage unit 313.

According to an example, the second distribution unit 360 may be provided to control a path through which the fluid moves between the energy storage unit 310 and the heat pump unit 320.

For example, the second distribution unit 360 may control a path through which the refrigerant moves between the first energy storage unit 311 and the heat pump unit 320. For example, the second distribution unit 360 may control a path through which the refrigerant moves between the first energy storage unit 311 and the first heat pump 321. The second distribution unit 360 may control a path through which the refrigerant moves between the first energy storage unit 311 and the second heat pump 323. The second distribution unit 360 may control a path through which the refrigerant moves between the first energy storage unit 311 and the third heat pump 325.

For example, the second distribution unit 350 may control a path through which the refrigerant moves between the second energy storage unit 313 and the heat pump unit 320. For example, the second distribution unit 360 may control a path through which the refrigerant moves between the second energy storage unit 313 and the first heat pump 321. The second distribution unit 360 may control a path through which the refrigerant moves between the second energy storage unit 313 and the second heat pump 323. The second distribution unit 360 may control a path through which the refrigerant moves between the second energy storage unit 313 and the third heat pump 325.

For example, the second distribution unit 360 may control a path through which the refrigerant moves between the second energy storage unit 313 and the heat dissipation unit 315.

According to an example, the third distribution unit 370 may be provided to control a path through which the fluid moves between the water tank unit 330, the pre-processing unit 340, or the water supply/drain unit.

For example, the third distribution unit 370 may open or close a path to move the water supplied from the water supply unit $w_{in}$ to the pre-processing unit 340 and/or the water tank unit 330. For example, the third distribution unit 370 may open or close a path to move water supplied from the water supply unit $w_{in}$ to the pre-processing unit 340. The third distribution unit 370 may open or close a path for moving the water supplied from the water supply unit $w_{in}$ to the first water tank 331 and/or the second water tank 333.

For example, the third distribution unit 370 may open or close a passage for discharging water present in the water tank unit 330 to the drain unit $w_{out}$. For example, the third distribution unit 370 may open or close a passage so that water present in the first water tank 331 flows out to the first drain unit $w_1$. Water discharged through the first drain unit $w_1$ may have a predetermined temperature. The predetermined temperature may be, e.g., 20° C. to 40° C. The third distribution unit 370 may open or close a passage so that water present in the second water tank 333 flows out to the second drain unit $w_2$. Water discharged through the second drain unit $w_2$ may have a predetermined temperature. The predetermined temperature may be, e.g., 40° C. to 80° C.

For example, the third distribution unit 370 may open or close a path through which steam moves from the third heat pump 325 to the third drain unit $w_3$. Water discharged through the third drain unit $w_3$ may have a predetermined temperature. The predetermined temperature may be, e.g., 120° C. to 160° C.

According to an example, the first distribution unit 350, the second distribution unit 360, or the third distribution unit 370 may be controlled by the processor 40 (e.g., the processor 40 of FIG. 1). The processor 40 may output a signal for opening and/or closing at least one valve included in the first to third distribution units 350, 360, and 370. The processor 40 may output a signal for operating at least one pump included in the first to third distribution units 350, 360, and 370. The processor 40 may adjust the direction in which thermal energy flows by controlling the first to third distribution units 350, 360, and 370.

According to an example, the processor 40 may select a mode to operate. The mode may include, e.g., a daytime operation, a nighttime operation, or a defrosting operation. The processor 40 may control the first to third distribution units 350, 360, and 370 in response to each selected operation. As the first to third distribution units 350, 360, and 370 are controlled, the processor 40 may adjust the flow of energy. As a result, the photovoltaic thermal regeneration system 1 may cool the light collection panel device 10 or heat the water stored in the water tank 330 using the thermal energy stored in the first energy storage unit 311 or the second energy storage unit 313.

According to an example, the external heat source unit 380 may be provided to cover thermal energy or radiate the stored thermal energy when thermal energy stored in heat circulation device 30 is insufficient. The external heat source unit 380 may be selectively configured and may be omitted as necessary. For example, when thermal energy to be consumed as the energy stored in the second energy storage unit 313 may not be supplied in the nighttime operation, the second energy storage unit 313 may supply thermal energy from the external heat source unit 380. When the temperature of the external heat source unit 380 is lower than the temperature of the second energy storage unit 313, it may be used to remove thermal energy from the second energy storage unit 313 instead of the heat dissipation unit 35. The external heat source unit 380 may be provided inside the heat circulation device 30 or may be provided independently of the heat circulation device 30.

According to an example, a conduit through which the refrigerant may be moved may be provided between the external heat source unit 380 and the second energy storage unit 313 to control the movement of energy from the external heat source unit 380 to the second energy storage unit 313. A valve may be provided in the conduit to control the movement of the refrigerant. The processor 40 may control the movement of the refrigerant between the external heat source unit 380 and the second energy storage unit 313 by outputting a signal for opening or closing the valve. Although not illustrated, the external heat source unit 380 and the second distribution unit 360 may be fluidly connected to each other. The second distribution unit 360 may transfer thermal energy transferred from the external heat source unit 380 to the first energy storage unit 311 or to the heat pump unit 320. The second distribution unit 360 may transfer the thermal energy transferred from the external heat source unit 380 to at least one of the first heat pump 321, the second heat pump 323, or the third heat pump 325.

Figure 4:
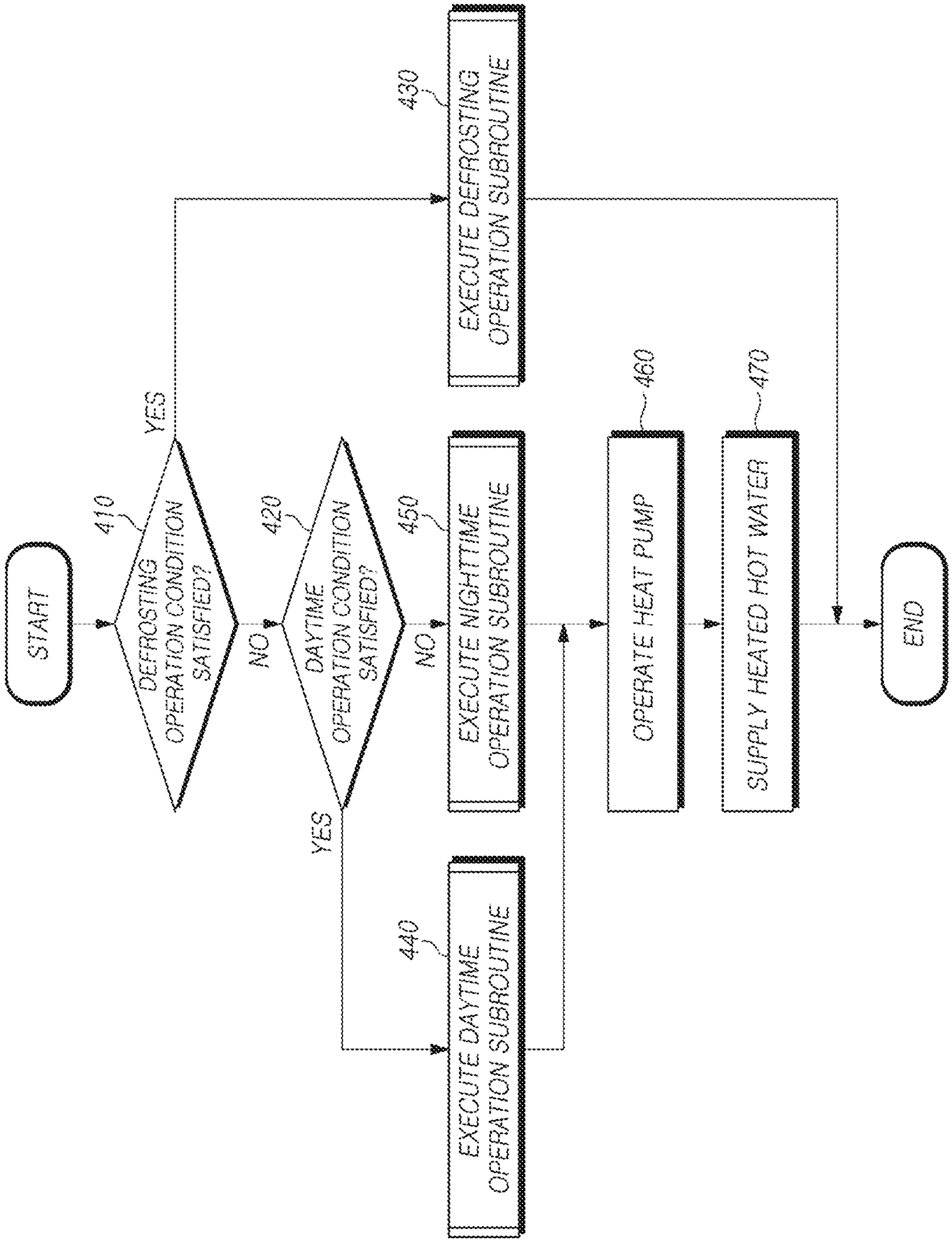
FIG. 4 is a flowchart illustrating example operations for thermal energy circulation in a photovoltaic thermal regeneration system according to various embodiments.

FIG. 4 is a flowchart illustrating example operations for thermal energy circulation in the photovoltaic thermal regeneration system 1 (e.g., the photovoltaic thermal regeneration system 1 of FIG. 1) (hereinafter referred to as the system 1), according to various embodiments. The order of the operations to be described in the flowchart of FIG. 4 may be changed as necessary, or the same operation may be repeated or omitted. Further, the operation described in the flowchart of FIG. 4 may be described with reference to the configuration illustrated in FIGS. 1, 2 and 3 (which may be referred to as FIGS. 1 to 3).

In the drawings, a daytime operation, a nighttime operation, and a defrosting operation to be performed by the system 1 are defined. The daytime operation may refer, for example, to an operation in an environment where the amount of light of an external light source (e.g., sunlight) that may be absorbed by the light collection panel device (e.g., the light collection panel device 10 of FIG. 1) is sufficient. The nighttime operation may refer, for example, to an operation in an environment where the amount of light of an external light source that may be absorbed by the light collection panel device 10 is insufficient. In other words, the daytime and nighttime operations may be determined, e.g., by the amount of light from an external light source to be absorbed by the light collection panel device 10 without relying on the current time. The processor (e.g., the processor 40 of FIG. 1) may select a daytime operation or a nighttime operation in consideration of weather information about the area where the system 1 is located obtained from the server.

Referring to FIG. 4, the system 1 may determine whether a condition for performing the defrosting operation is satisfied in operation 410. For example, conditions for performing the defrosting operation may include a case where the light collection unit 110 may not produce the target electrical energy due to foreign objects (e.g., snow, ice, hail) present on the light collection panel device 10.

According to an example, if the condition for performing the defrosting operation is satisfied, the system 1 may execute a subroutine for performing the defrosting operation in operation 430. The subroutine is described in greater detail below with reference to FIG. 9.

According to an example, in operation 420, the system 1 may determine whether the condition for performing the daytime operation is satisfied. The system 1 may obtain weather information from the server to determine whether the condition for performing the daytime operation is satisfied.

According to an example, if the condition for performing the daytime operation is satisfied, the system 1 may perform a subroutine for performing the daytime operation in operation 440. The subroutine is described in greater detail below with reference to FIG. 5.

According to an example, if the condition for performing the daytime operation is not satisfied, the system 1 may perform a subroutine for performing the nighttime operation in operation 450. The subroutine is described in in greater detail below with reference to FIG. 7.

According to an example, in operation 460, the system 1 may operate a heat pump (e.g., the heat pump unit 320 of FIG. 1) by selecting at least one of the daytime operation or the nighttime operation. The heat pump 320 may be operated to heat the water stored in the water tank unit (e.g., the water tank unit 330 of FIG. 1) to a predetermined temperature.

According to an example, in operation 460, the system 1 may operate the heat pump unit 320. The system 1 may input heat supplied from the first energy storage unit 311 and/or the second energy storage unit 313 to the heat pump unit 320 to output the temperature-elevated thermal energy. The system 1 may output a signal (e.g., the control signal $c_4$ of FIG. 1) for operating the heat pump unit 320. The heat pump unit 320 may be operated to raise the temperature of thermal energy and discharge the thermal energy. The discharged thermal energy may be input to the water tank unit 330 to heat the water stored in the water tank unit 330 to a predetermined temperature.

According to an embodiment, the system 1 may connect the first energy storage unit 311 to the pre-processing unit 340. The system 1 may supply thermal energy stored in the first energy storage unit 311 to the first pre-processing unit (e.g., the first pre-processing unit 341 of FIG. 2). The system 1 may control the second distribution unit 360. For example, the system 1 may open a valve 2-9 (e.g., the valve 2-9 360-9 of FIG. 2) of the second distribution unit 360. The system 1 may open a valve 2-10 (e.g., the valve 2-10 360-10 of FIG. 2) included in the second distribution unit 360. The remaining valves included in the second distribution unit 360 may be closed.

According to an embodiment, the system 1 may connect the second energy storage unit 313 to the pre-processing unit 340. The system 1 may supply thermal energy stored in the second energy storage unit 313 to the second pre-processing unit (e.g., the second pre-processing unit 343 of FIG. 2). The system 1 may control the second distribution unit 360. For example, the system 1 may open a valve 2-11 (e.g., the valve 2-11 360-11 of FIG. 2) included in the second distribution unit 360. The system 1 may open a valve 2-12 (e.g., the valve 2-12 360-12 of FIG. 2) of the second distribution unit 360. The remaining valves included in the second distribution unit 360 may be closed.

According to an example, in operation 470, the system 1 may supply heated hot water. The system 1 may discharge hot water heated by the heat pump 320 to a drain unit (e.g., the drain unit $w_{out}$ of FIG. 1).

According to an example, the system 1 may supply the hot water by controlling the third distribution unit (e.g., the third distribution unit 370 of FIG. 1).

According to an example, the system 1 may open a valve 3-6 (e.g., the valve 3-6 370-6 of FIG. 2) included in the third distribution unit 370. The remaining valves included in the third distribution unit 370 may be closed. Water stored in the water tank 330 (e.g., the water 330*b* of FIG. 2) may be discharged to the drain unit (e.g., the drain unit $w_{out}$ of FIG. 2).

According to an example, the drain unit $w_{out}$ may include a plurality of drain units according to a set temperature. For example, hot water of 20° C. to 40° C. may be discharged to the first drain unit $w_1$. Hot water of 40° C. to 80° C. may be discharged to the second drain unit $w_2$. Steam of 120° C. to 160° C. may be discharged to the third drain unit $w_3$. The system 1 may control a valve or pump included in the third distribution unit 370 to selectively open the drain unit $w_{out}$ according to the temperature to output hot water or steam.

Figure 5:
FIG. 5 is a flowchart illustrating example operations for performing a daytime operation in a photovoltaic thermal regeneration system according to various embodiments.

FIG. 5 is a flowchart illustrating example operations for performing the daytime operation in a photovoltaic thermal regeneration system 1 (e.g., the photovoltaic thermal regeneration system 1 of FIG. 1) according to various embodiments. The system 1 may select a daytime operation when the amount of sunlight from sunrise to sunset is larger than or equal to a threshold level.

Referring to FIG. 5, in operation 510, the system 1 may determine whether the energy storage capacity of the first energy storage unit (e.g., the first energy storage unit 311 of FIG. 1) is exceeded. The system 1 may determine whether energy exceeding a threshold capacity in which the first energy storage unit 311 may store has been stored. The capacity of thermal energy that the first energy storage unit 311 may store may vary according to the capacity, material, and thickness of the tank of the first energy storage unit 311.

According to an example, if the capacity of thermal energy stored in the first energy storage unit 311 does not exceed thermal energy capacity capable of storage in the first energy storage unit 311, the system 1 may calculate a condition for supplying thermal energy to the first energy storage unit 311 in operation 520. The system 1 may calculate the condition based on current or future weather information and the amount of energy to be consumed by the system 1. For example, the system 1 may communicate with a server to obtain information about the amount of sunlight for calculating the solar energy to be absorbed by the light collection panel device (e.g., the light collection panel device 10 of FIG. 1). The system 1 may obtain information about energy consumption stored in the server or a database inside the system 1. The system 1 may calculate a condition for supplying thermal energy from the light collection panel device 10 to the first energy storage unit 311 based on the obtained information.

For example, the system 1 may set a time period with the highest amount of sunlight as the condition for cooling the light collection panel device 10 by the first energy storage unit 311. The first energy storage unit 311 may lower the internal temperature below the ambient temperature by a forced cooling method. The forced cooling method is a method of consuming heat stored in the first energy storage unit 311 using the heat pump 320. The forced cooling method may consume heat relatively faster than the natural cooling method. Therefore, the first energy storage unit 311 may consume heat faster than the second energy storage unit 313 that consumes heat stored in the natural cooling method. As the light collection panel device 10 is cooled more quickly by the first energy storage unit 311, power generation efficiency of the light collection panel device 10 may be increased. Accordingly, the light collection panel device 10 may maintain high power generation efficiency in a time period when the amount of sunlight is the highest.

According to an example, the system 1 may determine whether the condition for supplying thermal energy from the light collection panel device 10 to the first thermal energy storage unit 311 is satisfied in operation 530.

According to an example, if the condition for supplying thermal energy to the first thermal energy storage unit 311 is satisfied, the system 1 may supply thermal energy from the light collection panel device 10 to the first energy storage unit 311 in operation 540. The system 1 may control the first distribution unit (e.g., the first distribution unit 350 of FIG. 1) to supply thermal energy from the light collection panel device 10 to the first energy storage unit 311.

For example, the system 1 may open the valve 1-1 (e.g., the valve 1-1 350-1 of FIG. 2) and the valve 1-2 (e.g., the valve 1-2 350-2 of FIG. 2) included in the first distribution unit 350. The remaining valves included in the first distribution unit 350 may be closed. The thermal energy may move from the heat collection unit 120 to the first energy storage unit 311. The first energy storage unit 311 may store thermal energy.

According to an example, the system 1 may determine whether the temperature of the first energy storage unit 311 exceeds a threshold temperature in operation 550. The threshold temperature may correspond to, e.g., a set temperature of the first energy storage unit 311. The critical temperature may be variously set according to a heat exchange material provided in the first energy storage unit 311.

According to an example, if the temperature of the first energy storage unit 311 exceeds the threshold temperature, the system 1 may supply thermal energy stored in the first energy storage unit 311 to a heat pump (e.g., the heat pump unit 320 of FIG. 1) in operation 560. The system 1 may control the second distribution unit (e.g., the second distribution unit 360 of FIG. 1) to supply thermal energy to the heat pump unit 320.

For example, in order to connect the first energy storage unit 311 and the heat pump unit 320, the system 1 may open the valve 2-1 (e.g., the valve 2-1 360-1 of FIG. 2), the valve 2-2 (e.g., the valve 2-2 360-2 of FIG. 2), and the valve 2-3 (e.g., the valve 2-3 360-3 of FIG. 2) included in the second distribution unit (e.g., the second distribution unit 360 of FIG. 2). The remaining valves included in the second distribution unit 360 may be closed. The system 1 may operate a pump 2-1 (e.g., the pump 2-1 361-1 of FIG. 2) included in the second distribution unit 360. The system 1 may supply thermal energy according to the predicted energy consumption to the heat pump unit 320 while maintaining the thermal energy capacity capable of storage in the first energy storage unit 311 by supplying thermal energy from the first energy storage unit 311 to the heat pump unit 320.

According to an example, if the temperature of the first energy storage unit 311 does not exceed the threshold temperature, the system 1 may supply the thermal energy stored in the second energy storage unit 313 to the heat pump unit 320 in operation 570. The system 1 may control the second distribution unit (e.g., the second distribution unit 360 of FIG. 1) to supply thermal energy to the heat pump unit 320.

For example, in order to connect the second energy storage unit 313 and the heat pump unit 320, the system 1 may open the valve 2-4 (e.g., the valve 2-4 360-4 of FIG. 2), the valve 2-7 (e.g., the valve 2-2 360-2 of FIG. 2), and the valve 2-7 (e.g., the valve 2-7 360-7 of FIG. 2) included in the second distribution unit (e.g., the second distribution unit 360 of FIG. 1) to connect the second energy storage unit 313 and the heat pump unit 320. The remaining valves included in the second distribution unit 360 may be closed. The system 1 may operate a pump 2-1 (e.g., the pump 2-1 361-1 of FIG. 2) included in the second distribution unit 360. The system 1 may supply thermal energy according to the predicted energy consumption to the heat pump unit 320 while maintaining the thermal energy capacity capable of storage in the second energy storage unit 313 by supplying thermal energy from the second energy storage unit 313 to the heat pump unit 320.

According to an example, if the capacity of thermal energy stored in the first energy storage unit 311 exceeds the capacity of thermal energy that may be stored in the first energy storage unit 311, the system 1 may supply thermal energy collected in the light collection panel device 10 to the second energy storage unit 313, and supply thermal energy stored in the second energy storage unit 313 to the heat pump unit 320.

According to an example, the system 1 may control the first distribution unit 350 to supply thermal energy from the light collection panel device 10 to the second energy storage unit 313.

For example, the system 1 may open the valve 1-3 (e.g., the valve 1-3 350-3 of FIG. 2) and the valve 1-4 (e.g., the valve 1-4 350-4 of FIG. 2) included in the first distribution unit 350. The remaining valves included in the first distribution unit 350 may be closed. The thermal energy may be transferred from the heat collection unit 120 to the second energy storage unit 313. The second energy storage unit 313 may store thermal energy.

According to an example, the system 1 may open or close the first energy storage unit 311 and the heat collection unit 120 even while the second energy storage unit 313 and the heat collection unit 120 are connected. When the system 1 closes the first energy storage unit 311 and the heat collection unit 120, the system 1 may control the first distribution unit 350. For example, the system 1 may close valve 1-1 (e.g., the valve 1-1 350-1 of FIG. 2) and the valve 1-2 (e.g., the valve 1-2 350-2 FIG. 2) included in the first distribution unit 350.

According to an example, the system 1 may control the second distribution unit 360 to supply thermal energy stored in the second energy storage unit 313 to the heat pump unit 320 in operation 580.

For example, the system 1 may open the valve 2-4 (e.g., the valve 2-4 360-4 of FIG. 2), the valve 2-2 (e.g., the valve 2-2 360-2 of FIG. 2), and the valve 2-7 (e.g., the valve 2-7 360-7 of FIG. 2) included in the second distribution unit (e.g., the second distribution unit 360 of FIG. 1) to connect the second energy storage unit 313 and the heat pump unit 320. The remaining valves included in the second distribution unit 360 may be closed. The system 1 may operate a pump 2-1 (e.g., the pump 2-1 361-1 of FIG. 2) included in the second distribution unit 360.

According to an example, in operation 590, the system 1 may determine whether the energy storage capacity of the second energy storage unit 313 is exceeded. The system 1 may determine whether energy exceeding the threshold capacity in which the second energy storage unit 313 may store has been stored. The capacity of thermal energy in which the second energy storage unit 313 may store may vary according to the capacity, material, and thickness of the tank of the second energy storage unit 313.

According to an example, if the capacity of thermal energy stored in the second energy storage unit 313 exceeds the capacity of thermal energy that may be stored in the second energy storage unit 313, the system 1 may dissipate thermal energy stored in the second energy storage unit 313 to a heat dissipation unit (e.g., the heat dissipation unit 315 of FIG. 1) in operation 600. The system 1 may control the second distribution unit 360 to connect the second energy storage unit 313 and the heat dissipation unit 315.

For example, the system 1 may open the valve 2-5 (e.g., the valve 2-5 360-5 of FIG. 2) and valve 2-6 (e.g., the valve 2-6 360-6 of FIG. 2) and valve 2-8 (e.g., the valve 2-8 360-8 of FIG. 2) included in the second distribution unit 360. The system 1 may operate the pump 2-2 (e.g., the pump 2-2 361-2 of FIG. 2) included in the second distribution unit 360. The remaining valves included in the second distribution unit 360 may be closed. The system 1 may discharge thermal energy equal to or larger than a threshold capacity stored in the second energy storage unit 313 to the outside through the heat dissipation unit 315. The system 1 may cool the light collection panel device 10. Thus, power generation efficiency of the cooled light collection panel device 10 may be increased.

Figure 6:
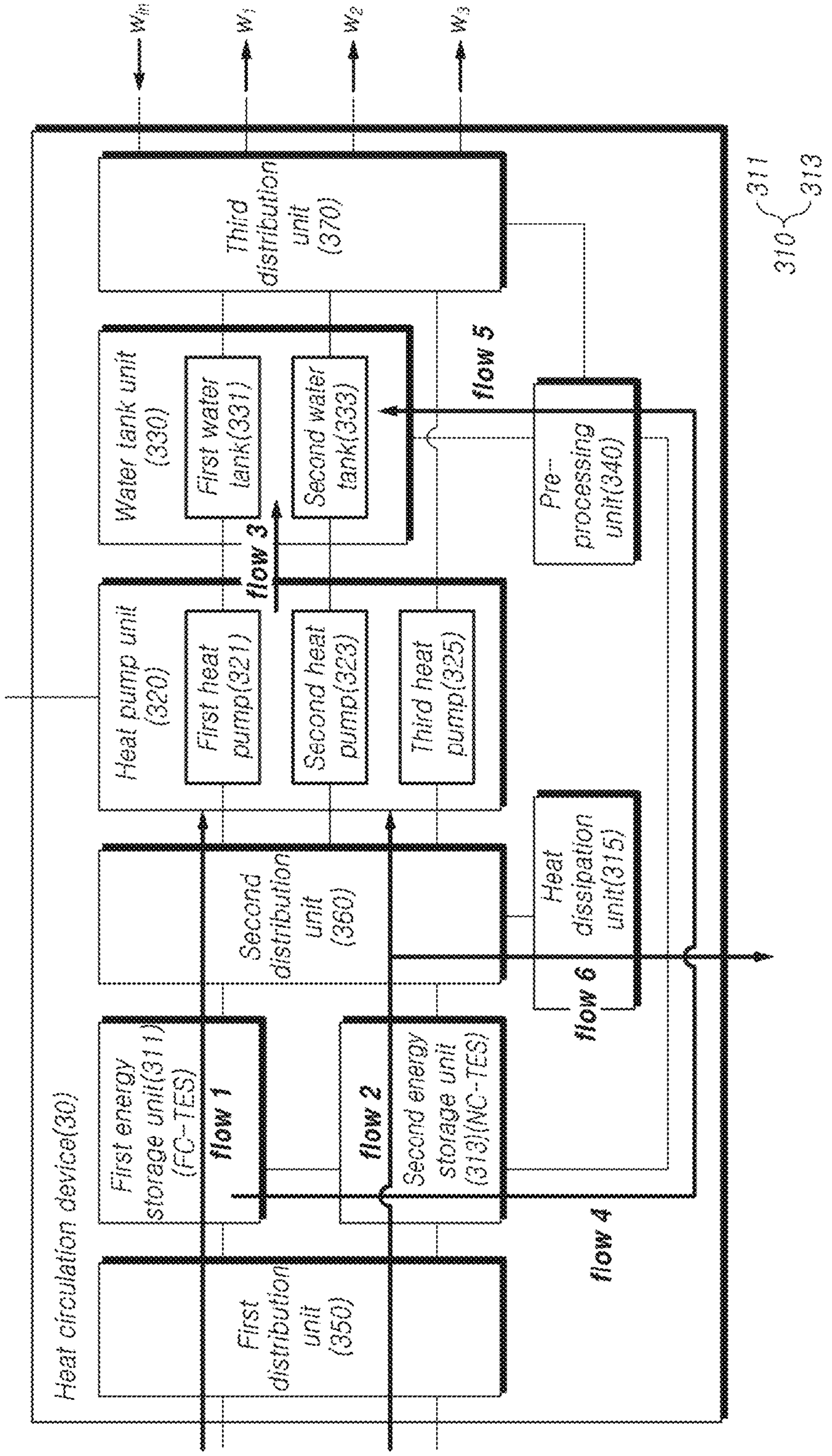
FIG. 6 is a diagram illustrating an example energy flow by a daytime operation of a photovoltaic thermal regeneration system according to various embodiments.

FIG. 6 is a diagram illustrating an example energy flow by a daytime operation of a photovoltaic thermal regeneration system 1 according to various embodiments.

Referring to FIG. 6, a direction indicated by an arrow may correspond to a path through which thermal energy moves. For example, the flow of thermal energy may include flow 1, flow 2, flow 3, flow 4, flow 5, or flow 6. Further, thermal energy may flow along more paths according to settings.

According to an example, energy may move from the light collection panel device 10 to the first energy storage unit 311 in flow 1. The energy may be transferred from the first energy storage unit 311 to the heat pump unit 320.

According to an example, energy may move from the light collection panel device (e.g., the light collection panel device 10 of FIG. 1) to the second energy storage unit 313 in flow 2. The energy may be transferred from the second energy storage unit 313 to the heat pump unit 320.

According to an example, energy may move from the heat pump unit 320 to the water tank unit 330 in flow 3. The thermal energy supplied to the water tank unit 330 may heat the water present in the water tank unit 330 to a predetermined temperature.

According to an example, energy may move from the first energy storage unit 311 or the second energy storage unit 313 to the pre-processing unit 340 in flow 4. The thermal energy may heat water present in the pre-processing unit 340 to a predetermined temperature. Water heated to the predetermined temperature may move to the water tank unit.

According to an example, energy may move from the first energy storage unit 311 or the second energy storage unit 313 to the water tank unit 330 via the pre-processing unit 340, in flow 5. The thermal energy may heat the water stored in the water tank unit 330 to a predetermined temperature.

According to an example, energy stored in the second energy storage unit 313 may be discharged to the outside (e.g., in the atmosphere) through the heat dissipation unit 315 in flow 6. When thermal energy higher than the storage capacity is stored in the second energy storage unit 313, the system 1 may discharge thermal energy to the outside through the heat dissipation unit 315.

Figure 7:
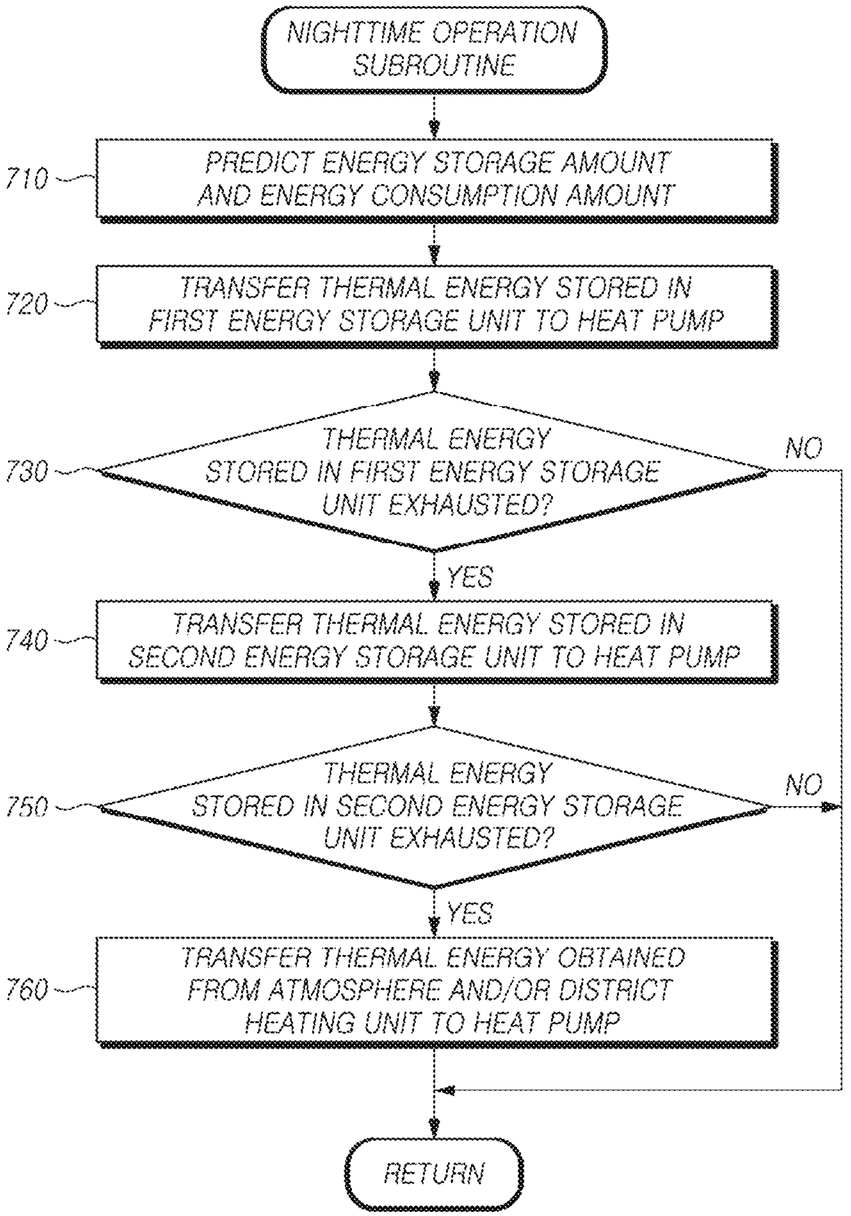
FIG. 7 is a flowchart illustrating example operations for performing a nighttime operation in a photovoltaic thermal regeneration system according to various embodiments.

FIG. 7 is a flowchart illustrating example operations for performing a nighttime operation in a photovoltaic thermal regeneration system 1 (e.g., the photovoltaic thermal regeneration system 1 of FIG. 1) according to various embodiments. The system 1 may select a nighttime operation when the amount of sunlight from sunrise to sunset is smaller than a threshold level. The differences between nighttime operation and daytime operation are that the light collection panel device 10 may not produce electrical energy from an external light source and that the light collection panel device 10 is not heated by thermal energy.

Referring to FIG. 7, in operation 710, the system 1 may predict an energy storage amount and an energy consumption amount. The energy storage amount may refer, for example, to the capacity of thermal energy stored in the first energy storage unit 311 and the second energy storage unit 313 during a daytime operation. The energy consumption amount may refer, for example, to the capacity of thermal energy required to heat the water stored in the water tank unit 330.

According to an example, the system 1 may statistically predict energy consumption. For example, the system 1 may predict the energy consumption amount by calculating an average of the thermal energy used for a predetermined period (e.g., one week, one month, season, one year).

According to an example, in operation 720, the system 1 may transfer thermal energy stored in the first energy storage unit 311 to the heat pump. The system 1 may control the second distribution unit (e.g., the second distribution unit 360 of FIG. 1) to connect the first energy storage unit 311 and the heat pump unit 320. For example, the system 1 may open the valve 2-1 (e.g., the valve 2-1 360-1 of FIG. 2), the valve 2-2 (e.g., the valve 2-2 360-2 of FIG. 2) and the valve 2-3 (e.g., the valve 2-3 360-3 of FIG. 2) included in the second distribution unit (e.g., the second distribution unit 360 of FIG. 1) to connect the first energy storage unit 311 and the heat pump unit 320. The remaining valves included in the second distribution unit 360 may be closed. The system 1 may operate a pump 2-1 (e.g., the pump 2-1 361-1 of FIG. 2) included in the second distribution unit 360.

According to an example, in operation 730, the system 1 may determine whether thermal energy stored in the first energy storage unit 311 is exhausted. The system 1 may compare the thermal energy stored in the first energy storage unit 311 with the predicted energy consumption amount.

According to an example, if the system 1 determines that the energy stored in the first energy storage unit 311 is insufficient as compared with the predicted heat consumption amount, in operation 740, the system 1 may transfer the thermal energy stored in the second energy storage unit 313 to the heat pump unit 320. For example, the system 1 may open the valve 2-4 (e.g., the valve 2-4 360-4 of FIG. 2), the valve 2-2 (e.g., the valve 2-2 360-2 of FIG. 2), and the valve 2-7 (e.g., the valve 2-7 360-7 of FIG. 2) included in the second distribution unit (e.g., the second distribution unit 360 of FIG. 1) to connect the second energy storage unit 313 and the heat pump unit 320. The remaining valves included in the second distribution unit 360 may be closed. The system 1 may operate the pump 2-1 (e.g., the pump 2-1 361-1 of FIG. 2) of the second distribution unit 360.

According to an example, in operation 750, the system 1 may determine whether thermal energy stored in the second energy storage unit 313 is exhausted. The system 1 may compare the thermal energy stored in the first energy storage unit and the second energy storage unit 313 with the predicted energy consumption amount.

According to an example, when determining that the energy stored in the first energy storage unit 311 and the second energy storage unit 313 is insufficient as compared with the predicted heat consumption amount, the system 1 may obtain thermal energy from the atmospheric and/or external heat source unit (e.g., the external heat source unit 380 of FIG. 3) in operation 760. For example, the system 1 may connect the heat dissipation unit 315 and the second energy storage unit 313 to obtain thermal energy from the atmosphere. When the temperature of the atmosphere is higher than that of the second energy storage unit 313 so that thermal energy may be supplied from the atmosphere to the second energy storage unit 313, the second energy storage unit 313 may receive energy from the heat dissipation unit 315. For example, the system 1 may connect the external heat source unit 380 and the second energy storage unit 313 to obtain thermal energy from the external heat source unit 380. The second energy storage unit 313 may receive thermal energy from the external heat source unit 380. Accordingly, even when the predicted heat consumption is larger than the stored heat consumption amount, the thermal energy required to operate the system 1 may be supplied.

Figure 8:
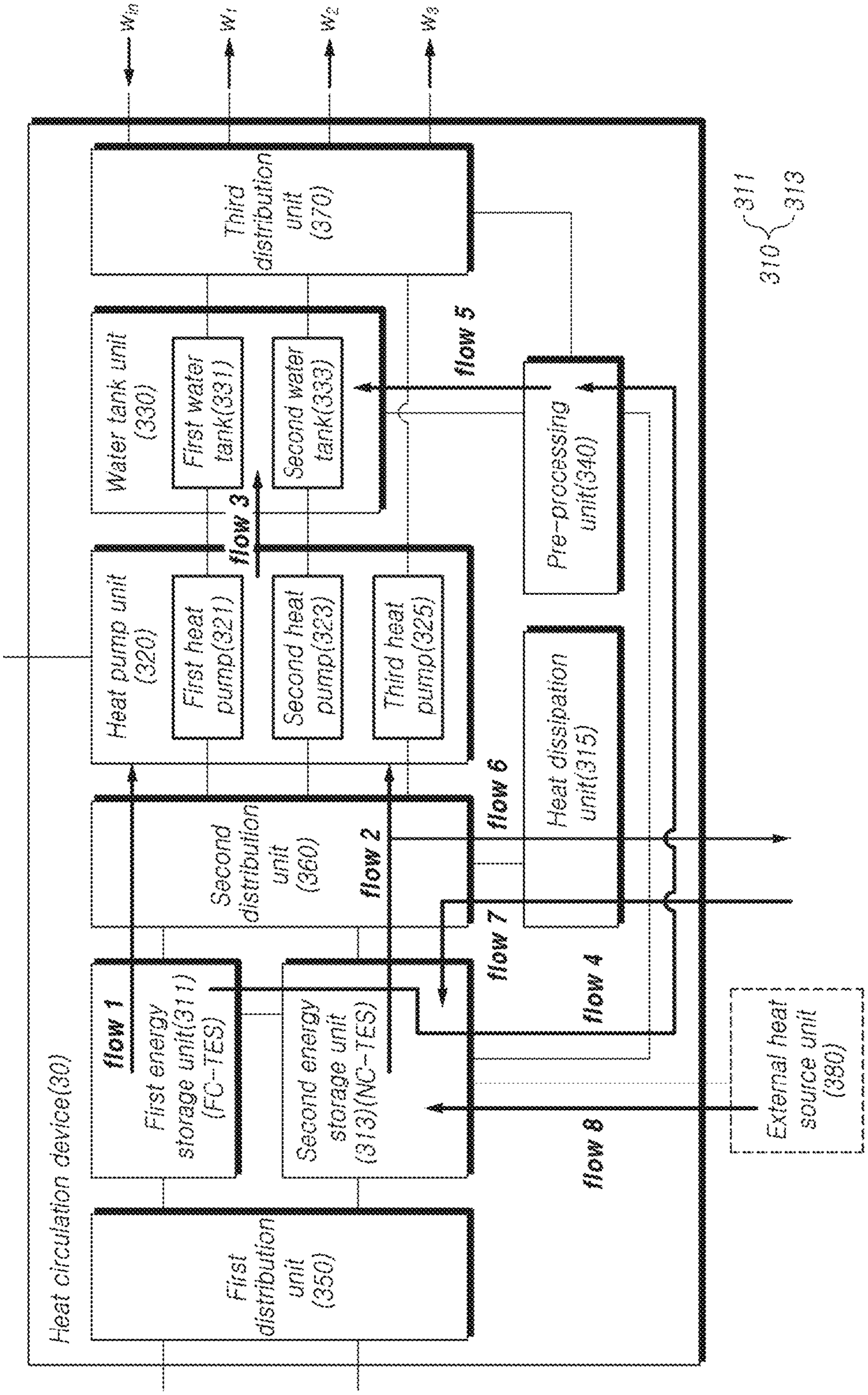
FIG. 8 is a diagram illustrating an example energy flow by a nighttime operation of a photovoltaic thermal regeneration system according to various embodiments.

FIG. 8 is a diagram illustrating an example energy flow by a nighttime operation of a photovoltaic thermal regeneration system 1 according to various embodiments.

Referring to FIG. 8, a direction indicated by an arrow may correspond to a path through which thermal energy moves. For example, the flow of thermal energy may include flow 1, flow 2, flow 3, flow 4, flow 5, flow 6, flow 7, or flow 8. Further, thermal energy may flow along more paths according to settings.

According to an example, energy may move from the first energy storage unit 311 to the heat pump unit 320 in flow 1.

According to an example, energy may move from the second energy storage unit 313 to the heat pump unit 320 in flow 2.

According to an example, energy may move from the heat pump unit 320 to the water tank unit 330 in flow 3. The thermal energy supplied to the water tank unit 330 may heat the water present in the water tank unit 330 to a predetermined temperature.

According to an example, energy may move from the first energy storage unit 311 or the second energy storage unit 313 to the pre-processing unit 340 in flow 4. The thermal energy may heat water present in the pre-processing unit 340 to a predetermined temperature. Water heated to the predetermined temperature may move to the water tank unit.

According to an example, energy may move from the first energy storage unit 311 or the second energy storage unit 313 to the water tank unit 330 via the pre-processing unit 340, in flow 5. The thermal energy may heat the water stored in the water tank unit 330 to a predetermined temperature.

According to an example, energy stored in the second energy storage unit 313 may be discharged to the outside (e.g., in the atmosphere) through the heat dissipation unit 315 in flow 6. When thermal energy higher than the storage capacity is stored in the second energy storage unit 313, the system 1 may discharge thermal energy to the outside through the heat dissipation unit 315.

According to an example, energy may move from the heat dissipation unit 315 absorbing thermal energy from the outside to the second energy storage unit 313 in flow 7. When the energy capacity stored in the first energy storage unit 311 and the second energy storage unit 313 is smaller than the predicted thermal energy consumption amount, the second thermal energy storage unit 313 may receive thermal energy from the outside.

According to an example, energy may move from the external heat source unit 380 to the second energy storage unit 313 in flow 8. When the energy capacity stored in the first energy storage unit 311 and the second energy storage unit 313 is smaller than the predicted thermal energy consumption amount, the second thermal energy storage unit 313 may receive thermal energy from the external heat source unit 380.

Figure 9:
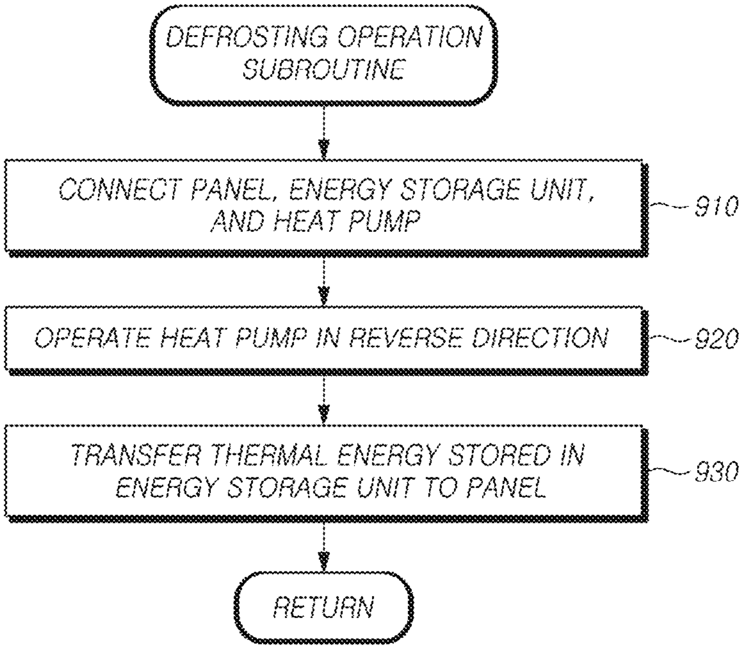
FIG. 9 is a flowchart illustrating example operations for performing a defrosting operation in a photovoltaic thermal regeneration system according to various embodiments.

FIG. 9 is a flowchart illustrating example operations for performing a defrosting operation in a photovoltaic thermal regeneration system 1 (e.g., the photovoltaic thermal regeneration system 1 of FIG. 1) according to various embodiments.

Referring to FIG. 9, the system 1 may connect the light collection panel device 10, the energy storage unit (e.g., the first energy storage unit 311 or the second energy storage unit 313), and the heat pump unit 320 in operation 910. The system 1 may control the first distribution unit (e.g., the first distribution unit 350 of FIG. 1) to connect the heat collection unit (e.g., the heat collection unit 110 of FIG. 1) to the first energy storage unit 311. For example, the system 1 may open the valve 1-1 (e.g., the valve 1-1 350-1 of FIG. 2) and valve 1-2 (e.g., the valve 1-2 350-2 of FIG. 2) included in the first distribution unit 350. The remaining valves included in the first distribution unit 350 may be closed. The system 1 may control the second distribution unit (e.g., the second distribution unit 360 of FIG. 1) to connect the first energy storage unit 311 and the heat pump unit 320. For example, the system 1 may open the valve 2-1 (e.g., the valve 2-1 360-1 of FIG. 2), the valve 2-2 (e.g., the valve 2-2 360-2 of FIG. 2) and the valve 2-3 (e.g., the valve 2-3 360-3 of FIG. 2) included in the second distribution unit (e.g., the second distribution unit 360 of FIG. 1) to connect the first energy storage unit 311 and the heat pump unit 320. The remaining valves included in the second distribution unit 360 may be closed. The system 1 may operate a pump 2-1 (e.g., the pump 2-1 361-1 of FIG. 2) included in the second distribution unit 360.

According to an example, the system 1 may control the first distribution unit 350 to connect the heat collection unit (e.g., the heat collection unit 110 of FIG. 1) and the second energy storage unit 311. For example, the system 1 may open the valve 1-3 (e.g., the valve 1-3 350-3 of FIG. 2) and valve 1-4 (e.g., the valve 1-4 350-4 of FIG. 2) included in the first distribution unit 350. The remaining valves included in the first distribution unit 350 may be closed. For example, the system 1 may open the valve 2-4 (e.g., the valve 2-4 360-4 of FIG. 2), the valve 2-2 (e.g., the valve 2-2 360-2 of FIG. 2), and the valve 2-7 (e.g., the valve 2-7 360-7 of FIG. 2) included in the second distribution unit (e.g., the second distribution unit 360 of FIG. 1) to connect the second energy storage unit 313 and the heat pump unit 320. The remaining valves included in the second distribution unit 360 may be closed. The system 1 may operate a pump 2-1 (e.g., the pump 2-1 361-1 of FIG. 2) included in the second distribution unit 360.

According to an example, in operation 920, the system 1 may operate the heat pump unit 320 in the reverse direction. The system 1 may output a signal for controlling the heat pump unit 320 to operate in the reverse direction. The heat pump unit 320 may discharge heat from the second heat exchanger (e.g., the second heat exchanger **320*b* of FIG. 2) to the first heat exchanger (e.g., the first heat exchanger 320*a* of FIG. 2) by operating in the reverse direction by a control signal. The heat discharged from the heat pump unit 320 may move to the first energy storage unit 311 or the second energy storage unit 313**.

According to an example, in operation 930, the system 1 may transfer thermal energy stored in the first energy storage unit 311 or the second energy storage unit 313 to the light collection panel device 10. In order to transfer thermal energy to the light collection panel device 10, the system 1 may control the first distribution unit 350. The system 1 may control the first distribution unit 350 to open between the first energy storage unit 311 and/or the second energy storage unit 313 and the light collection panel device 10. The system 1 may control the second distribution unit 360 to close the first energy storage unit 311 and/or the second energy storage unit 313 and the heat pump unit 320. For example, the system 1 may close the valve 1-3 (e.g., the valve 1-3 350-3 of FIG. 2) and the valve 1-4 (e.g., the valve 1-4 350-4 of FIG. 2) included in the first distribution unit 350. For example, the system 1 may close the valve 2-4 (e.g., the valve 2-4 360-4 of FIG. 2), the valve 2-2 (e.g., the valve 2-2 360-2 of FIG. 2), and the valve 2-7 (e.g., the valve 2-7 360-7 of FIG. 2) included in the second distribution unit (e.g., the second distribution unit 360 of FIG. 1) in order to connect the second energy storage unit 313 and the heat pump unit 320.

According to an example, the system 1 may heat the light collection panel device 10 by reversely operating the heat pump unit 320 to transmit thermal energy to the light collection panel device 10. By heating the light collection panel device 10 to a predetermined temperature, frost, snow, or ice accumulated in the light collection panel device 10 may be melted.

Figure 10:
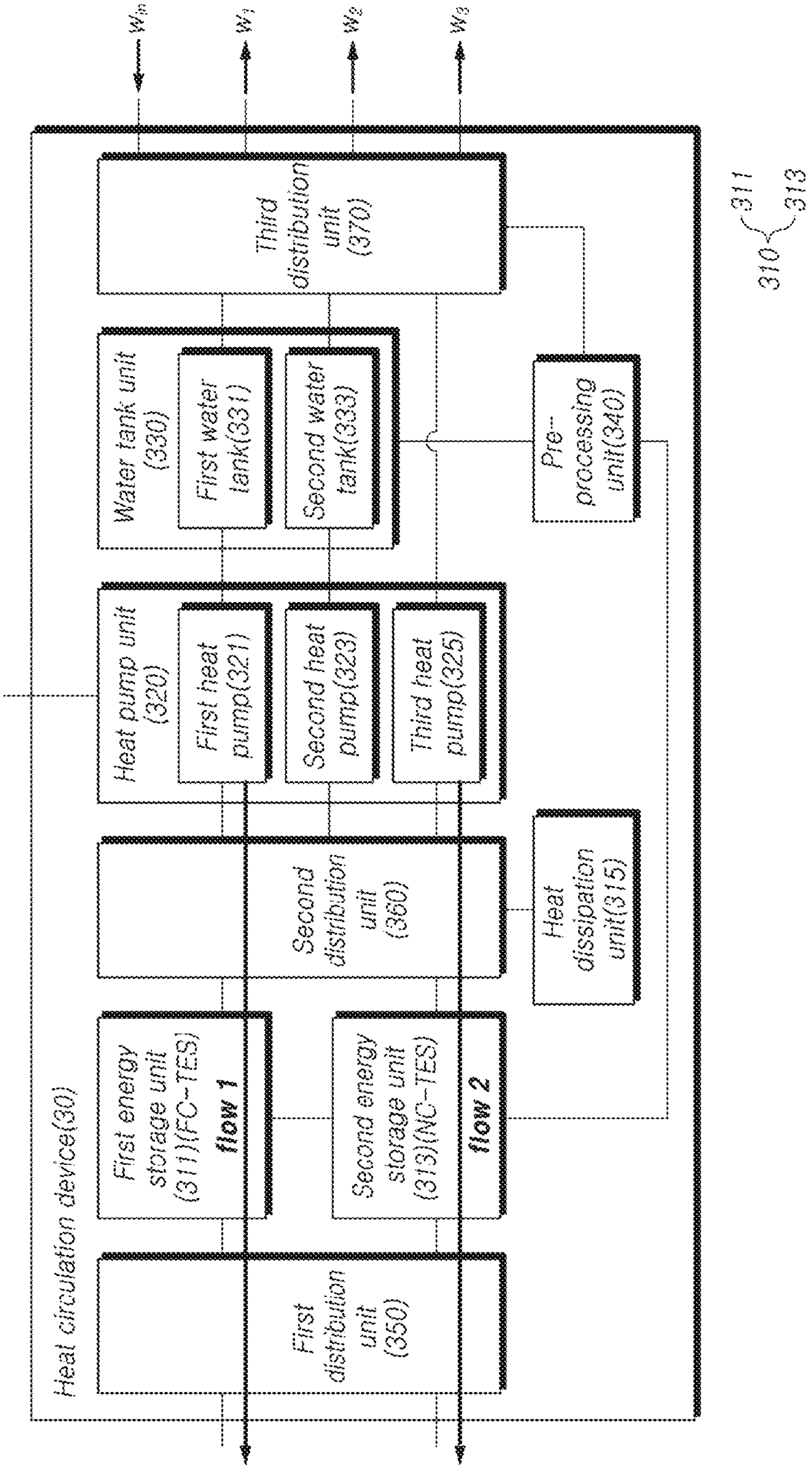
FIG. 10 is a diagram illustrating an example energy flow by a defrosting operation of a photovoltaic thermal regeneration system according to various embodiments.

FIG. 10 is a diagram illustrating an example energy flow by a defrosting operation of a photovoltaic thermal regeneration system 1 according to various embodiments.

Referring to FIG. 10, a direction indicated by an arrow may correspond to a path through which thermal energy moves. As an example, the flow of thermal energy may include flow 1 or flow 2.

According to an example, energy may move from the heat pump unit 320 to the heat collection unit 120 via the first energy storage unit 311 in flow 1.

According to an example, energy may move from the heat pump unit 320 to the heat collection unit 120 via the second energy storage unit 313 in flow 2.

According to an example, the system 1 may heat the light collection panel device 10 to a predetermined temperature by raising the heat from the output end of the heat pump unit 320 and moving it to the heat collection unit 120. The system 1 may melt frost, snow, or ice accumulated on the light collection panel device 10.

Figure 11:
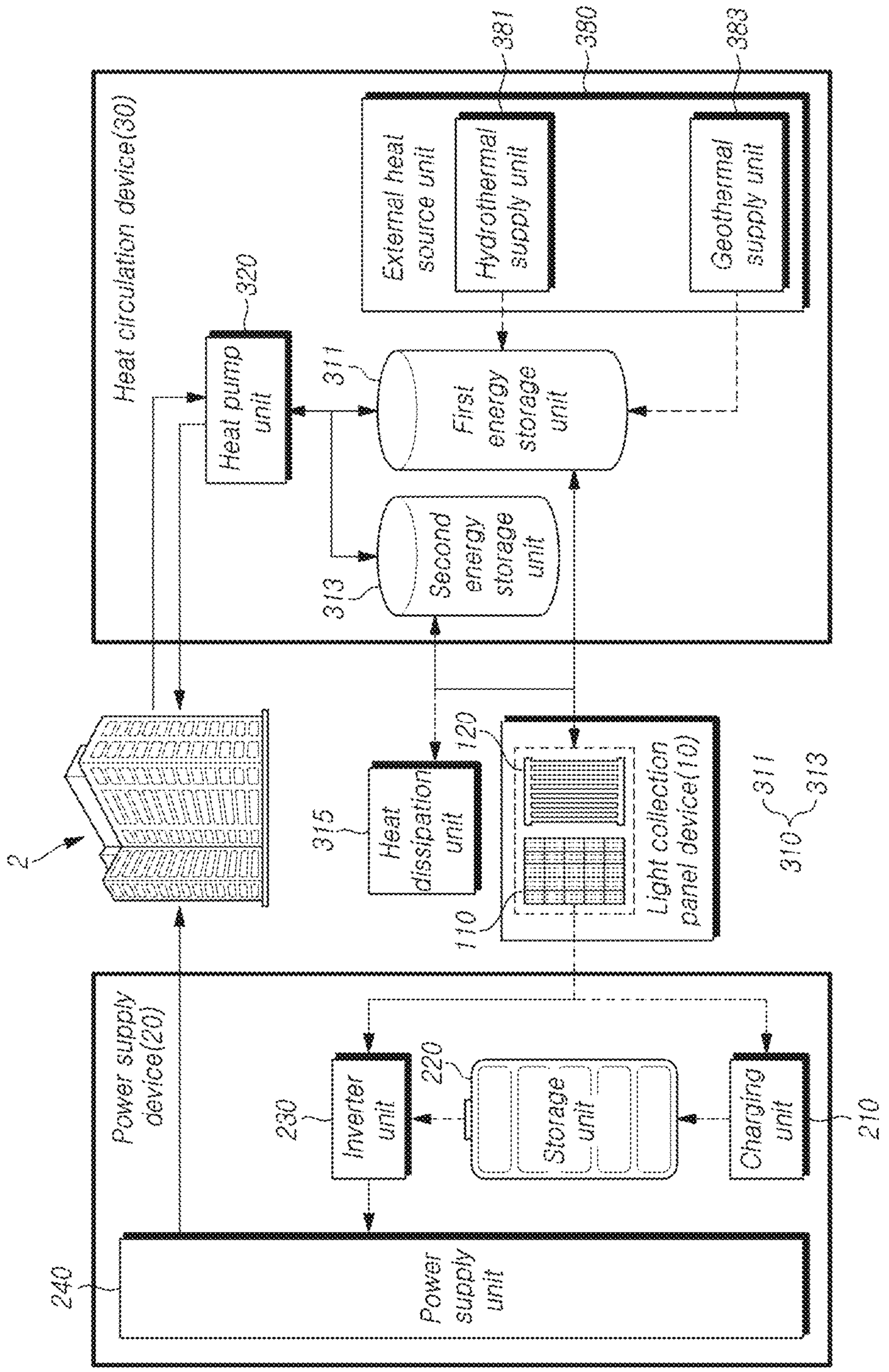
FIG. 11 is a system diagram illustrating an application example of a photovoltaic thermal regeneration system according to various embodiments.

FIG. 11 is a diagram illustrating an example application of a photovoltaic thermal regeneration system 1 according to various embodiments. The system diagram illustrates that the photovoltaic thermal regeneration system 1 is coupled to a building 2, and may correspond to some or all of the components of FIGS. 1 to 3. Therefore, the differences are mainly described.

Referring to FIG. 11, a photovoltaic thermal regeneration system 1 may be coupled to a building 2. The building 2 is not limited to a simple constructed object such as a building, but may be implemented as a road or a sidewalk.

According to an example, the light collection panel device 10 may be disposed on an outer wall or an upper end (e.g., rooftop) of the building 2. The light collection panel device 10 may obtain electrical energy and thermal energy from an external light source.

According to an example, heat circulation device 30 may heat or cool the interior of the building 2. The heat circulation device 30 may store thermal energy obtained by the light collection panel device 10 or may raise the temperature through the heat pump unit 320 to discharge it. The heat circulation device 30 may receive heat from the building 2 or supply heat to the building 2 to control the temperature of the building 2.

According to an example, the external heat source unit 380 may include a hydrothermal supply unit 381 or a geothermal supply unit 383. The external heat source unit 380 may further include a district heating unit. The hydrothermal supply unit 371 may be implemented as, e.g., a wide-area water supply. At least one of the hydrothermal supply unit 381 and the geothermal supply unit 383 may be omitted as necessary.

According to an example, the photovoltaic thermal regeneration system 1 may be integrated with the building 2. The system 1 may be provided to meet renewable energy 100 (RE100) by utilizing renewable energy without damaging nature.

A photovoltaic thermal regeneration system 1 according to an embodiment of the disclosure may comprise a light collection panel unit 10 configured such that heat generated from a photovoltaic PV cell 110 disposed on a front surface is absorbed by a refrigerant flowing through a pipe passing through a rear surface. The photovoltaic thermal regeneration system 1 may comprise at least two energy storage units 311, 313 having an inner space filled with a thermal energy storage material 312, 314 and configured to transfer, to the thermal energy storage material 312, 314, heat from thermal energy of the refrigerant flowing through the pipe passing through the inner space after absorbing the heat while passing through the light collection panel unit 10. The at least two energy storage units 311, 313 may include a first energy storage unit FC-TES 311 configured such that a first thermal energy storage material 312 filling the inner space is forcibly cooled by a first heat pump 321. The at least two energy storage units 311, 313 may include a second energy storage unit NC-TES 313 configured such that a second thermal energy storage material 314 filling the inner space is naturally cooled through heat dissipation.

In the photovoltaic thermal regeneration system 1 according to an embodiment of the disclosure, an energy storage density of the first thermal energy storage material 312 may be different from an energy storage density of the second thermal energy storage material 314.

In the photovoltaic thermal regeneration system 1 according to an embodiment of the disclosure, the thermal energy storage material 312, 314 may include either a material storing heat as sensible heat, a phase change material PCM, or a thermo-chemical material TCM.

In the photovoltaic thermal regeneration system 1 according to an embodiment of the disclosure, a set temperature of the first energy storage unit 311 may be lower than a set temperature of a second energy storage unit 313.

The photovoltaic thermal regeneration system 1 according to an embodiment of the disclosure may comprise a valve 360-1, 360-2, 360-3 for opening or closing a pipe that fluidly connects between the first energy storage unit 311 and the first heat pump 321.

The photovoltaic thermal regeneration system 1 according to an embodiment of the disclosure may comprise at least one tank 331 storing a fluid **330*b* to be heated by heat energy delivered from the first heat pump 321**.

In the photovoltaic thermal regeneration system 1 according to an embodiment of the disclosure, a bypass pipe may be provided from one end of the energy storage units 311, 313 to the at least one tank 331 to transfer heat energy from the energy storage units 311, 313 to the at least one tank 331.

The photovoltaic thermal regeneration system 1 according to an embodiment of the disclosure may comprise at least one heat pump 323, 325 having a set temperature different from the first heat pump 321.

The photovoltaic thermal regeneration system 1 according to an embodiment of the disclosure may comprise at least two tanks 331, 333 configured to heat a stored fluid by thermal energy raised by the first heat pump 321 or the at least one heat pump 323.

The photovoltaic thermal regeneration system 1 according to an embodiment of the disclosure may be configured to, if a surface temperature of the light collection panel unit 10 is less than a preset temperature, control the first heat pump 321 to reversely operate to transfer heat energy to the light collection panel unit 10.

A method for operating a photovoltaic thermal regeneration system 1, according to an embodiment of the disclosure, may comprise transferring thermal energy generated from a light collection panel unit 10 to at least two energy storage unit 311, 313. The operation method may comprise transferring the thermal energy to at least one of a first energy storage unit (FC-TES) 311 configured such that a first thermal energy storage material 312 filling the inner space is forcibly cooled by a first heat pump 321 or a second energy storage unit (NC-TES) 313 configured such that a second thermal energy storage material 314 filling the inner space is naturally cooled through heat dissipation.

The method for operating the photovoltaic thermal regeneration system 1 according to an embodiment of the disclosure may comprise controlling a first valve 350-1, 350-2 to form a circulation path of a refrigerant for transferring thermal energy generated from a light collection panel unit 10 to a first thermal energy storage material 312 filling an inner space of a first energy storage unit 311. The operation method may comprise controlling a second valve 360-1, 360-2, 360-3 and a heat pump 320 to form a circulation path of a fluid for forced cooling of the first thermal energy storage material 312. The operation method may comprise controlling a third valve 350-3, 350-4 to form a circulation path of the refrigerant for transferring the thermal energy generated from the light collection panel unit 10 to a second thermal energy storage material 314 filling an inner space of a second energy storage unit 313. The operation method may comprise controlling a fourth valve 360-4, 360-5, 360-6, 360-7, 360-8 to form a circulation path of the fluid for natural cooling of the second thermal energy storage material 314 or forced cooling by the heat pump 320.

The method for operating the photovoltaic thermal regeneration system 1 according to an embodiment of the disclosure may comprise opening or closing the second valve 360-1, 360-2, 360-3 to enable a fluid flow from the first energy storage unit 311 to the heat pump 320 for forced cooling.

The method for operating the photovoltaic thermal regeneration system 1 according to an embodiment of the disclosure may comprise obtaining weather forecast information or energy consumption prediction information to control the first to fourth valves 350-1, 350-2, 350-3, 350-4, 360-1, 360-2, 360-3, 360-4, 360-5, 360-6, 360-7, 360-8.

The method for operating the photovoltaic thermal regeneration system 1 according to an embodiment of the disclosure may comprise controlling 460 the first to fourth valves 350-1, 350-2, 350-3, 350-4, 360-1, 360-2, 360-3, 360-4, 360-5, 360-6, 360-7, 360-8 to operate a photovoltaic thermal energy system 1 at night based on the weather forecast information.

The method for operating the photovoltaic thermal regeneration system 1 according to an embodiment of the disclosure may comprise controlling the at least one second valve 360-1, 360-2, 360-3 to provide a path for transferring energy stored in the first energy storage unit 311 to the heat pump 320 based on the energy consumption prediction information.

The method for operating the photovoltaic thermal regeneration system 1 according to an embodiment of the disclosure may comprise controlling the heat pump 320 to reversely operate if a surface temperature of the light collection panel unit 10 is less than a preset temperature.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, alternatives and/or variations of the various example embodiments may be made without departing from the true technical spirit and full technical scope of the disclosure, including the appended claims and their equivalents. It will also be understood that any of the embodiment(s) described herein may be used in conjunction with any other embodiment(s) described herein.

What is claimed is:

1. A photovoltaic thermal regeneration system, comprising:

a light collection panel unit including a photovoltaic cell configured to absorb heat generated from the photovoltaic cell disposed on a front surface by a refrigerant flowing through a pipe passing through a rear surface of the light collection panel unit; and at least two energy storage units having an inner space filled with a thermal energy storage material and configured to transfer, to the thermal energy storage material, heat from thermal energy of the refrigerant flowing through the pipe passing through the inner space after absorbing the heat while passing through the light collection panel unit, wherein the at least two energy storage units include:

a first energy storage unit configured to forcibly cool a first thermal energy storage material filling the inner space by a first heat pump; and a second energy storage unit configured to naturally cool a second thermal energy storage material filling the inner space through heat dissipation.

2. The photovoltaic thermal regeneration system of claim 1, wherein an energy storage density of the first thermal energy storage material is different from an energy storage density of the second thermal energy storage material.

3. The photovoltaic thermal regeneration system of claim 1, wherein the thermal energy storage material comprises a material storing heat as sensible heat, a phase change material (PCM), or a thermo-chemical material (TCM).

4. The photovoltaic thermal regeneration system of claim 1, wherein a set temperature of the first energy storage unit is lower than a set temperature of the second energy storage unit.

5. The photovoltaic thermal regeneration system of claim 1, comprising a valve configured to open and/or close a pipe fluidly connected between the first energy storage unit and the first heat pump.

6. The photovoltaic thermal regeneration system of claim 1, comprising at least one tank configured to store a fluid to be heated by heat energy delivered from the first heat pump.

7. The photovoltaic thermal regeneration system of claim 6, wherein a bypass pipe is configured from one end of the at least two energy storage units to the at least one tank to transfer heat energy from the at least two energy storage units to the at least one tank.

8. The photovoltaic thermal regeneration system of claim 1, comprising at least one heat pump having a set temperature different from the first heat pump.

9. The photovoltaic thermal regeneration system of claim 8, comprising at least two tanks configured to heat a stored fluid by thermal energy raised by the first heat pump or the at least one heat pump.

10. The photovoltaic thermal regeneration system of claim 1, wherein the photovoltaic thermal regeneration system is configured to, based on a surface temperature of the light collection panel unit being less than a specified temperature, control the first heat pump to reversely operate to transfer heat energy to the light collection panel unit.

* * * * *